United States Patent
Kobayashi et al.

(10) Patent No.: US 11,079,224 B2
(45) Date of Patent: Aug. 3, 2021

(54) OFFSET DERIVATION DEVICE, OFFSET CALCULATION DEVICE, AND AZIMUTH SENSOR

(71) Applicant: Rohm Co., Ltd., Kyoto (JP)

(72) Inventors: Tadashi Kobayashi, Kyoto (JP); Masafumi Seike, Kyoto (JP); Hideki Nishiyama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 563 days.

(21) Appl. No.: 15/771,118

(22) PCT Filed: Oct. 25, 2016

(86) PCT No.: PCT/JP2016/081511
§ 371 (c)(1),
(2) Date: Apr. 26, 2018

(87) PCT Pub. No.: WO2017/073532
PCT Pub. Date: May 4, 2017

(65) Prior Publication Data
US 2018/0321036 A1 Nov. 8, 2018

(30) Foreign Application Priority Data

Oct. 29, 2015 (JP) .............................. JP2015-213227
Jun. 28, 2016 (JP) ................................. 2016-127851
Oct. 3, 2016 (JP) ................................. 2016-195474

(51) Int. Cl.
*G01C 17/28* (2006.01)
*G01C 17/38* (2006.01)

(52) U.S. Cl.
CPC ............. *G01C 17/28* (2013.01); *G01C 17/38* (2013.01)

(58) Field of Classification Search
None
See application file for complete search history.

(56) References Cited

U.S. PATENT DOCUMENTS 4,862,081 A * 8/1989 Denison ................. G01R 33/56
324/307
6,534,969 B1 * 3/2003 Dietmayer ............. G01D 5/145
324/207.12
(Continued)

FOREIGN PATENT DOCUMENTS

JP 2000-009468 1/2000
JP 4391416 B2 10/2009
WO 2005-003683 1/2005

OTHER PUBLICATIONS

Japan Patent Office, International Search Report for PCT/JP2016/081511 dated Jan. 24, 2017, (with English translation).

*Primary Examiner* — Lina M Cordero
*Assistant Examiner* — Brandon J Becker
(74) *Attorney, Agent, or Firm* — Fish & Richardson P.C.

(57) ABSTRACT

In this azimuth angle sensor, original magnetic detection data is sequentially acquired as data points in a triaxial coordinate system by detecting magnetism on three axes. An offset derivation device provided to the azimuth angle sensor derives offset values for correcting the original magnetic detection data and generating corrected magnetic detection data. The offset derivation device uses a plurality of data points in the original magnetic detection data or in the corrected magnetic detection data to derive provisional offset values, then derives the magnitude of magnetism on such an occasion on the basis of the original magnetic detection data and the provisional offset values. When the magnitude of magnetism thus derived is within a predetermined correction success range, the offset values are updated using the provisional offset values. When the magnitude of magnetism thus derived is not within the predetermined correction success range, the offset values are not updated.

16 Claims, 29 Drawing Sheets

(56) References Cited

U.S. PATENT DOCUMENTS

| | | | | |
|---|---|---|---|---|
| 7,210,236 | B2* | 5/2007 | Sato | G01C 17/38 33/355 R |
| 2005/0237058 | A1* | 10/2005 | Takasugi | G01R 33/4625 324/307 |
| 2005/0256673 | A1 | 11/2005 | Hikida et al. | |
| 2007/0033818 | A1* | 2/2007 | Kitamura | G01C 17/38 33/355 R |
| 2008/0022763 | A1* | 1/2008 | Maute | E21B 47/10 73/152.29 |
| 2014/0046625 | A1* | 2/2014 | Baecher | G01B 7/30 702/151 |
| 2014/0153075 | A1* | 6/2014 | Malacarne | H04B 10/541 359/238 |

* cited by examiner

FIG.5A
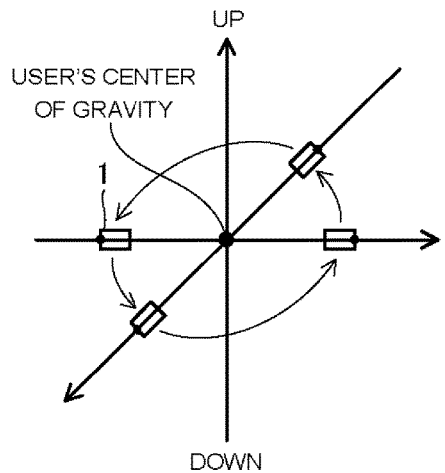
FIG.5B
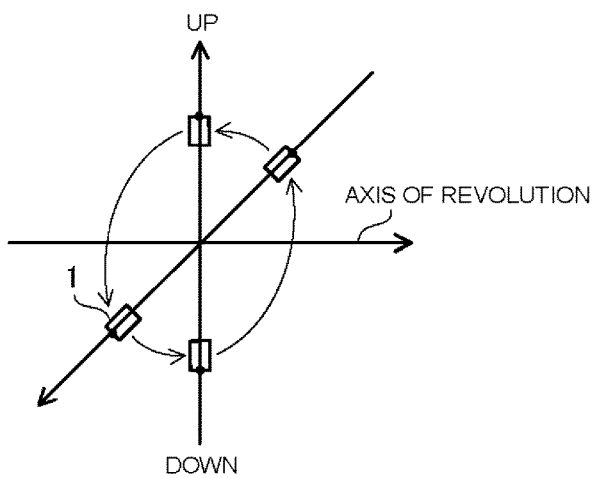
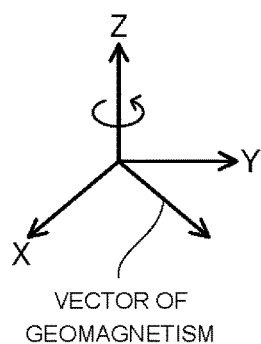
FIG.6A
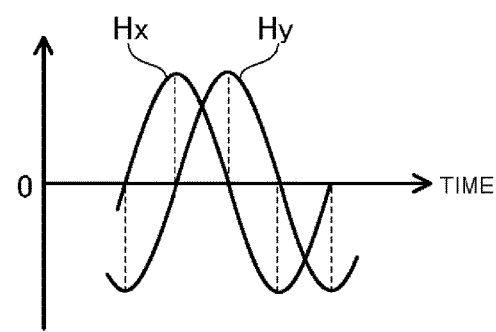
FIG.6B

● : DATA POINTS (6 POINTS) CORRESPONDING TO MAXIMUM & MINIMUM VALUES FOR 3 AXES
○ : DATA POINTS OTHER THAN THE 6 POINTS ABOVE

● : DATA POINTS (6 POINTS) CORRESPONDING TO MAXIMUM & MINIMUM VALUES FOR 3 AXES
○ : DATA POINTS OTHER THAN THE 6 POINTS ABOVE

OFFSET DERIVATION DEVICE, OFFSET CALCULATION DEVICE, AND AZIMUTH SENSOR

TECHNICAL FIELD

The present invention relates to offset derivation devices and offset calculation devices, and relates also to azimuth sensors employing them.

BACKGROUND ART

An azimuth sensor (geomagnetism sensor) measures the azimuth by sensing the direction of geomagnetism. However, the geomagnetism as the measurement target is feeble. Accordingly, for accurate sensing of the azimuth, it is necessary to sense true geomagnetism by canceling an offset ascribable to an external magnetic field present in the surroundings (such as a magnetic field generated inside a device incorporating the azimuth sensor and a magnetic field generated by a powerful magnet placed around the azimuth sensor) and an offset ascribable to the performance of the azimuth sensor itself (see, for example, Patent Document 1 identified below).

LIST OF CITATIONS

Patent Literature

Patent Document 1: Japanese Patent registered as No. 4391416

SUMMARY OF THE INVENTION

Technical Problem

An offset in an azimuth sensor constantly varies both temporally and spatially. Thus, for accurate sensing of the azimuth, the offset in the azimuth sensor needs to be kept being canceled continually. To keep canceling the offset that constantly varies both temporally and spatially, an offset value for offset correction needs to be updated successively.

However, it can occur that, when the offset value is derived, the accuracy of the derived result is temporarily poor for some cause. Controlling the updating operation with this taken into consideration is expected to lead to higher accuracy of the offset value used in offset correction, and hence higher accuracy of the sensing of the azimuth.

In view of the foregoing, a first object of the present invention is to provide a device and a method for offset derivation that contribute to higher accuracy of an offset value related to magnetism sensing, and to provide an azimuth sensor and an electronic device that employ such an offset derivation device.

As a method for offset correction, it is possible to adopt one involving manual correction done purposefully by the user or one involving automatic correction requiring no intervention by the user, and it is preferable to adopt the latter for enhanced friendliness to the user and enhanced sensing accuracy of the azimuth sensor.

However, the conventional technology disclosed in Patent Document 1 requires an extremely large amount of computation for offset correction. Thus, inconveniently, to keep cancelling an offset fast and continually requires high computation performance.

On the other hand, in cases where an azimuth sensor is mounted on an automobile or the like, it moves only slightly in the vertical-axis direction with respect to the earth's surface. This, inconveniently, makes it difficult to cancel an offset accurately.

In view of the above-mentioned inconveniences encountered by the present inventors, a second object of the present invention is to provide an offset calculation device, and an azimuth sensor employing it, that can, even in a case where magnetism detection data along three axes exhibits a small variation width along one of the axes, accurately calculate offsets along the individual axes.

Means for Solving the Problem

To achieve the first object above, an offset derivation device according to one aspect of the present invention is an offset derivation device that derives an offset value for generating corrected magnetism detection data by correcting original magnetism detection data acquired sequentially as data points in a three- or two-axis coordinate system through the sensing of magnetism along three or two axes, and includes: a tentative value deriver configured to calculate a tentative value of the offset value by using a plurality of data points in the original or corrected magnetism detection data; and an updater configured to derive the magnitude of the magnetism based on the original magnetism detection data and the tentative value, the updater being configured, if the derived magnitude of the magnetism is within a predetermined reference range, to update the offset value with the tentative value and otherwise to keep the offset value unupdated.

Specifically, for example, the updater can be configured, if the derived magnitude of the magnetism is within the predetermined reference range, to update the offset value with the tentative value and update also the reference range based on the derive magnitude of the magnetism, and otherwise to keep the offset value and the reference range unupdated.

More specifically, for example, when the reference range is updated based on the derived magnitude of the magnetism, the updated reference range can be a range that includes the derived magnitude of the magnetism.

More specifically, for example, when the reference range is updated based on the derived magnitude of the magnetism, the updated reference range can be a range that is centered about the derived magnitude of the magnetism.

For another example, the offset derivation device can further include: an initial setter configured to set, as the reference range before updating, an initial reference range based on the original magnetism detection data.

Specifically, for another example, the tentative value deriver can be configured to take one of the plurality of data points, which comprise N data points (where N is an integer of 2 or more), as a reference data point, and translate uniformly the plurality of data points such that the reference data point coincides with the origin of the three- or two-axis coordinate system, thereby to set (N−1) imaginary data points except for the reference data point, and then to derive, as an imaginary offset point, either a point that is located at the center of a curved surface passing through the origin O of the three-axis coordinate system and that minimizes the sum of the distances from the curved surface to the respective imaginary data points or a point that is located at the center of a curved line passing through the origin O of the two-axis coordinate system and that minimizes the sum of the distances from the curved line to the respective imaginary data points, and translate the imaginary offset point such that the previously done translation is undone, thereby to derive the tentative value.

More specifically, for example, when, in the three-axis coordinate system, the coordinate values of an ith imaginary data point among the (N−1) imaginary data points are represented by (Hxi', Hyi', Hzi') (where i is an integer of 1 or more but (N−1) or less) and the coordinate values of the imaginary offset point are represented by (Hx0', Hy0', Hz0'), the tentative value deriver can derive the coordinate values of the imaginary offset value so as to minimize the value of the function FH1 given by formula (A1) below:

[Formula 1]

$$F_{H1} = \sum_{i=1}^{N-1} \frac{(Hxi'^2 + Hyi'^2 + Hzi'^2 - 2Hxi' \cdot Hx0' - }{2Hyi' \cdot Hy0' - 2Hzi' \cdot Hz0')^2} \quad (A1)$$

Instead, for example, when, in the two-axis coordinate system, the coordinate values of the ith imaginary data point among the (N−1) imaginary data points are represented by (Hxi', Hyi') (where i is an integer of 1 or more but (N−1) or less) and the coordinate values of the imaginary offset point are represented by (Hx0', Hy0'), the tentative value deriver can derive the coordinate values of the imaginary offset value so as to minimize the value of the function FH2 given by formula (A2) below:

[Formula 2]

$$F_{H2} = \sum_{i=1}^{N-1} (Hxi'^2 + Hyi'^2 - 2Hxi' \cdot Hx0' - 2Hyi' \cdot Hy0')^2 \quad (A2)$$

According to another aspect of the present invention, an azimuth sensor includes: a magnetism detection device configured to generate original magnetism detection data through the sensing of magnetism along three or two axes; an offset derivation device as described above configured to derive an offset value for the original magnetism detection data; an offset correction device configured to generate corrected magnetism detection data by correcting the original magnetism detection data by using the offset value; and an azimuth calculator configured to generate azimuth data from the corrected magnetism detection data.

According to another aspect of the present invention, an electronic device includes: an azimuth sensor as described above.

An offset derivation method according to another aspect of the present invention is an offset derivation method for calculating an offset value for generating corrected magnetism detection data by correcting original magnetism detection data acquired sequentially as data points in a three- or two-axis coordinate system through the sensing of magnetism along three or two axes, and includes: a tentative value deriving step of calculating a tentative value of the offset value by using a plurality of data points in the original or corrected magnetism detection data; and an updating step of deriving the magnitude of the magnetism based on the original magnetism detection data and the tentative value and, if the derived magnitude of the magnetism is within a predetermined reference range, updating the offset value with the tentative value and otherwise keeping the offset value unupdated.

To achieve the second object above, according to one aspect of what is disclosed herein, an offset calculation device is configured to refer to three-axis magnetism detection data acquired sequentially as data points in a three-axis coordinate space, thereby to continually search for six data points (Hxi, Hyi, Hzi) (where i=1 to 6) corresponding to the maximum values and the minimum values for individual axes respectively;

to determine a seventh reference data point (Hx7, Hy7, Hz7) when the differences between the maximum and minimum values for the individual axes respectively are all larger than a threshold value;

to translate uniformly, of the six data points, at least the four points corresponding respectively to the maximum and minimum values for the X and Y axes such that the reference data point coincides with the origin (0, 0, 0) while ignoring the coordinate values for the Z axis, thereby to calculate imaginary data points (Hxi', Hyi') (where i=1 to 4) on the XY coordinate plane;

to calculate an imaginary offset point (Hx0', Hy0') on the XY coordinate plane that minimizes the function F1 given by formula (f1) below by using the imaginary data points (Hxi', Hyi');

[Formula 3]

$$F1=\Sigma_i(Hxi'^2+Hyi'^2-2Hxi' \cdot Hx0'-2Hyi' \cdot Hy0')^2 \quad (f1)$$

to translate the imaginary offset point (Hx0', Hy0') such that the previously done translation of the reference data point is undone, thereby to calculate offset values Hx0 and Hy0 for the X and Y axes;

to translate uniformly the six data points such that the reference data point coincides with the origin, thereby to calculate six imaginary data points (Hxi', Hyi', Hzi') (where i=1 to 6);

to calculate an imaginary offset value Hz0' that minimizes the function F2 given by formula (f2) below by using the imaginary offset point (Hx0', Hy0') and the six imaginary data points (Hxi', Hyi', Hzi'); and

[Formula 4]

$$F2=\Sigma_i(Hxi'^2+Hyi'^2+HZi'^2-2Hxi' \cdot Hx0'-2Hyi' \cdot Hy0'-2Hzi' \cdot Hz0')^2 \quad (f2)$$

to translate the imaginary offset value Hz0' such that the previously done translation of the reference data point is undone, thereby to calculate an offset value Hz0 for the Z axis (a first configuration).

In the offset calculation device according to the first configuration described above, the offset values Hx0 and Hy0 may be calculated by use of, instead of formula (f1) above, formulae (f3a) and (f3b) below (a second configuration).

[Formula 5]

$$Hx0 = \frac{Hx(\max) + Hx(\min)}{2}, \quad (f3a)$$

$$Hy0 = \frac{Hy(\max) + Hy(\min)}{2} \quad (f3b)$$

In the offset calculation device according to the first or second configuration described above, the threshold value can be set separately for the individual axes respectively according to the magnitude of the spatial magnetic field at the site or according to the XY-plane component and the Z-axis component obtained by breaking it down (a third configuration).

In the offset calculation device according to the third configuration described above, the threshold value for the Z axis can be smaller than either of the threshold values for the X and Y axes (a fourth configuration).

In the offset calculation device according to the third or fourth configuration described above, the magnitude of the spatial magnetic field can be broken down into the XY-plane and Z-axis components by use of the magnetic dip of geomagnetism at the site (a fifth configuration).

In the offset calculation device according to the fifth configuration described above, the magnitude of the spatial magnetic field and the magnetic dip can be calculated by use of new offset values newly calculated for the individual axes, and according to whether or not the calculated values each satisfy a predetermined condition, whether or not to discard the new offset values can be decided (a sixth configuration).

In the offset calculation device according to any one of the first to sixth configurations described above, the reference data point is a data point at a predetermined distance or more from any of, of the six data points, at least the four points corresponding respectively to the maximum and minimum values for the X and Y axes (a seventh configuration).

According to another aspect of what is disclosed herein, an offset calculation device is configured, in calculating offsets for magnetism detection data along three axes respectively, to separately perform offset calculation for the X and Y axes and offset calculation for the Z axis, along which data variation is smaller than along the X and Y axes (an eighth configuration).

More specifically, in the offset calculation device according to the eighth configuration described above, the device can be configured to first calculate offset values for the X and Y axes and then, by using the results of the calculation, calculate an offset value for the Z axis (a ninth configuration).

According to another aspect of what is disclosed herein, an azimuth sensor includes: a magnetism detection device configured to generate three-axis magnetism detection data; an offset calculation device according to any one of the first to ninth configurations described above configured to calculate an offset value for the magnetism detection data; an offset correction device configured to correct the offset value for the magnetism detection data; and an azimuth computation device configured to generate azimuth data from the corrected magnetism detection data (a tenth configuration).

Advantageous Effects of the Invention

According to the present invention, it is possible to provide a device and a method for offset derivation that contribute to higher accuracy of an offset value related to magnetism sensing, and to provide an azimuth sensor and an electronic device that employ such an offset derivation device.

According to the present invention, it is also possible to provide an offset calculation device, and an azimuth sensor employing it, that can, even in a case where magnetism detection data along three axes exhibits a small variation width along one of the axes, accurately calculate offsets along the individual axes.

BRIEF DESCRIPTION OF DRAWINGS

FIG. 5A is a diagram illustrating a first example of the waving movement of the azimuth sensor;

FIG. 5B is a diagram illustrating a second example of the waving movement of the azimuth sensor;

FIG. 6A is a diagram showing how the vector of geomagnetism rotate about the Z axis;

FIG. 6B is a diagram showing how the X- and Y-axis components of magnetism detection data change as the vector of geomagnetism rotate about the Z axis;

DESCRIPTION OF EMBODIMENTS

First Embodiment

Hereinafter, an example according to a first embodiment of the present invention will be described specifically with reference to the accompanying drawings. Among the drawings referred to in the course, the same parts are identified by common reference signs, and in principle no overlapping description as to the same parts will be repeated. In the present description, for the sake of simplicity, a symbol or sign referring to a piece of information, signal, physical quantity, member, or the like is occasionally used alone with the designation of the piece of information, signal, physical quantity, member, or the like omitted or abbreviated. In any flow chart referred to later, any plurality of processes in any plurality of steps can be performed in any modified order, or concurrently, so long as no contradiction arises.

<Overall Configuration>

Figure 1:
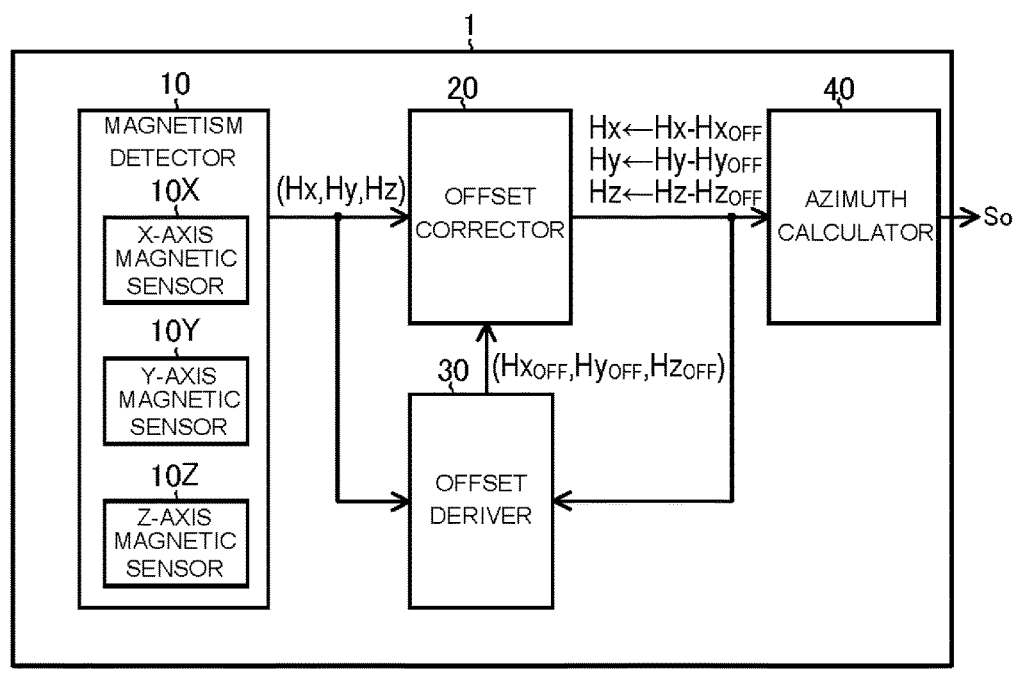
FIG. 1 is a block diagram showing the overall configuration of an azimuth sensor according to a first embodiment of the present invention.

FIG. 1 is a block diagram showing the overall configuration of an azimuth sensor 1 according to the first embodiment of the present invention. The azimuth sensor 1 includes a magnetism detector 10, an offset corrector 20, and an offset deriver 30, and an azimuth calculator 40.

The magnetism detector 10 senses the magnetism at the location where the azimuth sensor 1 is present. The magnetism as the sensing target includes geomagnetism, and can even be grasped as geomagnetism itself. The magnetism detector 10 is a three-axis magnetism detector that senses magnetism as the sensing target along each of X-, Y-, and Z-axes. That is, the magnetism detector 10 includes magnetic sensors 10X, 10Y, and 10Z which sense X-, Y-, and Z-axis components of the magnetism as the sensing target, and generate and output three-axis magnetism detection data (Hx, Hy, Hz). The data Hx, Hy, and Hz output from the magnetism detector 10 represent the X-, Y-, and Z-axis components, respectively, of the magnetism sensed by the magnetism detector 10. The X-, Y-, and Z-axes are perpendicular to each other. As magnetism detection devices in the magnetic sensors 10X, 10Y, and 10Z, for example, Hall-effect devices can be used, or MR (magnetoresistance) devices can be used.

The offset corrector 20, by using offset values fed from the offset deriver 30, corrects the magnetism detection data (Hx, Hy, Hz) output from the 10 to output corrected magnetism detection data (Hx, Hy, Hz). This correction is called offset correction. The offset values are offset components ($Hx_{OFF}$, $Hy_{OFF}$, $Hz_{OFF}$) contained in the magnetism detection data (Hx, Hy, Hz) output from the magnetism detector 10. That is, $Hx_{OFF}$, $Hy_{OFF}$, and $Hz_{OFF}$ are the offset components in the Hx, Hy, and Hz output from the magnetism detector 10. Accordingly, when the X-, Y-, and Z-axis components in the magnetism detection data before offset correction are represented by Hx, Hy, and Hz respectively, and the X-, Y-, and Z-axis components in the magnetism detection data after offset correction are represented by Hxc, Hyc, and Hzc respectively, then "$Hxc=Hx-Hx_{OFF}$", "$Hyc=Hy-Hy_{OFF}$", and "$Hzc=Hz-Hz_{OFF}$". In the following description, for the sake of clarity, the magnetism detection data (Hx, Hy, Hz) before offset correction in particular is occasionally called original magnetism detection data, and the magnetism detection data (Hx, Hy, Hz) after offset correction in particular is occasionally called corrected magnetism detection data.

The offset deriver 30 derives and sets offset values ($Hx_{OFF}$, $Hy_{OFF}$, $Hz_{OFF}$) based on the original or corrected magnetism detection data, and updates the offset values ($Hx_{OFF}$, $Hy_{OFF}$, $Hz_{OFF}$) as necessary.

The azimuth calculator 40 generates and outputs azimuth data So based on the magnetism detection data (Hx, Hy, Hz). The azimuth data So represents the direction in which the magnetism (geomagnetism as the sensing target) points in a three-axis coordinate system comprising X, Y, and Z axes (in other words, in a three-axis coordinate space). More specifically, for example, the azimuth data So can represent the relationship between the direction of the X axis and the direction of geomagnetism.

The magnetism detector 10 senses magnetism periodically, and generates and outputs the latest original magnetism detection data (Hx, Hy, Hz) successively. In keeping with that, the offset corrector 20 generates and outputs the latest corrected magnetism detection data (Hx, Hy, Hz) periodically, and the azimuth calculator 40 generates and outputs the latest azimuth data So periodically.

Although, in FIG. 1, the offset corrector 20, the offset deriver 30, and the azimuth calculator 40 are shown each as an independent processing block, these processing blocks may be implemented in a centralized fashion by use of a CPU (central processing unit) or DSP (digital signal processor).

<Offset Derivation Processing>

Figure 2:
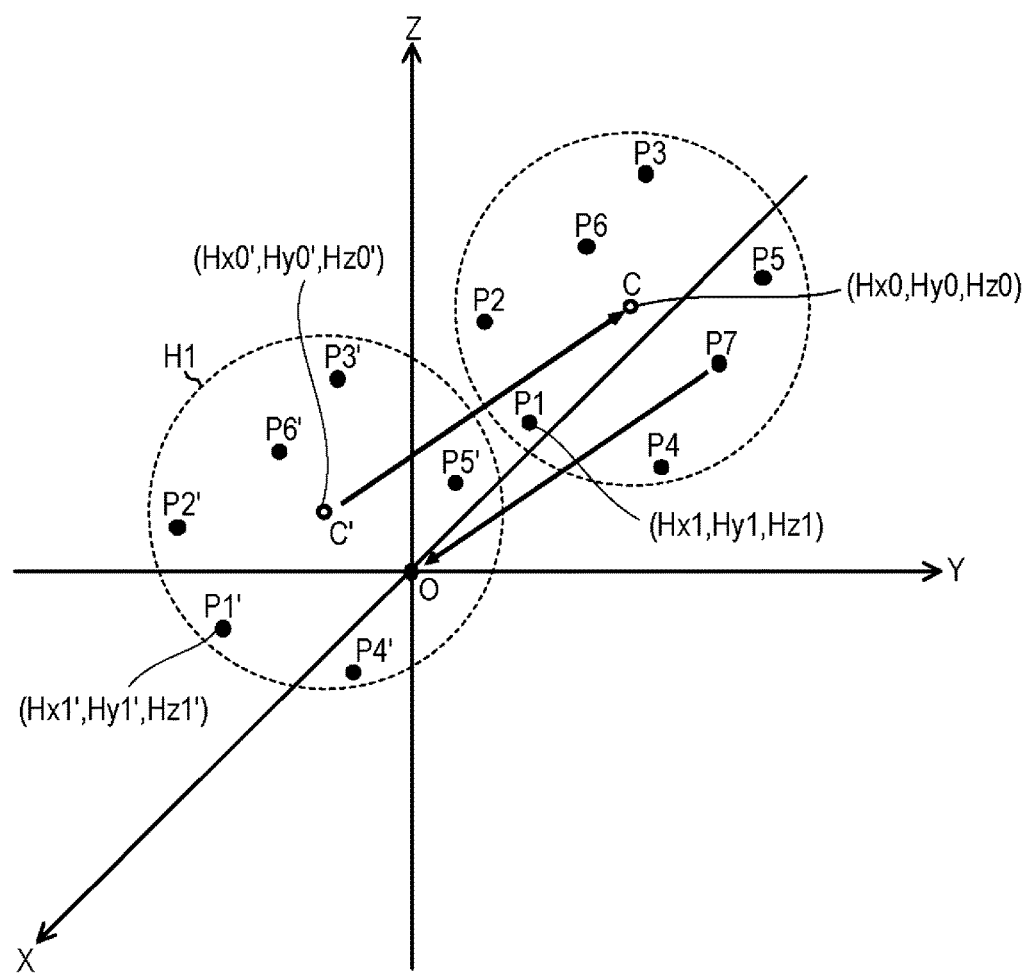
FIG. 2 is a three-axis coordinate space diagram (XYZ coordinate space diagram) in illustration of offset derivation processing according to the first embodiment of the present invention.

With reference to FIG. 2, offset derivation processing that can be performed in the offset deriver 30 will be described. FIG. 2 is a three-axis coordinate space diagram (XYZ coordinate space diagram) related to the offset derivation processing. One block of magnetism detection data (Hx, Hy, Hz) is handled as one data point in a three-axis coordinate system (that is, an XYZ coordinate system having X, Y, and Z axes as coordinate axes). In the offset derivation processing, N data points in the three-axis magnetism detection data (Hx, Hy, Hz) acquired sequentially as data points in the three-axis coordinate system are referred to as N evaluation data points. N is any integer of 2 or more, and in the example in FIG. 2, "N=7". That is, seven mutually different data points P1 to P7 are referred to as a first to a seventh evaluation data point. Incidentally, where the magnetism detector 10 provides high accuracy, it is possible to obtain sufficient offset derivation accuracy even with a small number of evaluation data points referred to.

Each evaluation data point can be a data point in the corrected magnetism detection data. In that case, the coordinate values of a data point Pi as an ith evaluation data point are represented by the coordinate values (Hxi, Hyi, Hzi) of one data point in the corrected magnetism detection data (where i is an integer). That is, the X-, Y-, and Z-axis coordinate values of the data point Pi are represented by the X-axis coordinate value Hxi, the Y-axis coordinate value Hyi, and the Z-axis coordinate value Hzi of one data point in the corrected magnetism detection data (where i is an integer).

Instead, each evaluation data point can be a data point in the original magnetism detection data. In that case, the coordinate values of a data point Pi as an ith evaluation data point are represented by the coordinate values (Hxi, Hyi, Hzi) of one data point in the original magnetism detection data (where i is an integer). That is, The X-, Y-, and Z-axis coordinate values of the data point Pi are represented by the X-axis coordinate value Hxi, the Y-axis coordinate value Hyi, and the Z-axis coordinate value Hzi of one data point in the original magnetism detection data (where i is an integer).

After the data points P1 to P7 are set, these data points P1 to P7 are translated uniformly such that a reference data point arbitrarily singled out of the data points P1 to P7 coincides with the origin O (0, 0, 0) of the three-axis coordinate system. Here, it is assumed that the data point P7 is singled out as the reference data point. Then, through the translation, except for the reference data point P7, six imaginary data points Pr to P6' are derived and set. The imaginary data points Pr to P6' represent respectively the data points P1 to P6 after the translation.

Next, in the three-axis coordinate system, an imaginary offset point C' that minimizes the sum of the distances from a curved surface H1 passing through the origin O to the imaginary data points P1' to P6' (the sum of a total of six distances) is found. That is, the coordinate values of an imaginary offset point C' that minimizes the value of the function $F_{H1}$ of a curved surface H1 given by formula (1) below are calculated. Here, Hxi', Hyi', and Hzi' represent respectively the X-, Y-, and Z-axis coordinate values of the imaginary data point Pi' (where i is any integer, and is here an integer of 1 or more but (N−1) or less), and Hx0', Hy0', and Hz0' represent respectively the X-, Y-, and Z-axis coordinate values of the imaginary offset point C'. It is here assumed that the curved surface H1 is a spherical surface having its center at the imaginary offset point C' and passing through the origin O (accordingly, the radius of the spherical surface equals the distance from the origin O to the imaginary offset point C').

[Formula 6]

$$F_{H1} = \sum_{i=1}^{6} (Hxi'^2 + Hyi'^2 + Hzi'^2 - 2Hxi' \cdot Hx0' - 2Hyi' \cdot Hy0' - 2Hzi' \cdot Hz0')^2 \quad (1)$$

Finally, the imaginary offset point C' is translated such that the previously done translation is undone, and thereby the true offset point C is calculated. That is, the point obtained by translating the data point P7 to the origin O and then translating the imaginary offset point C' by the same amount of movement but in the opposite direction is the offset point C. Hx0, Hy0, and Hz0 represent respectively the X-, Y-, and Z-axis coordinate values of the offset point C. The (Hx0, Hy0, Hz0) derived by this method can be substituted in the offset values ($Hx_{OFF}$, $Hy_{OFF}$, $Hz_{OFF}$) (that is, the offset values can be updated) and then fed to the offset corrector 20. However, as will be discussed in detail later, if the derived (Hx0, Hy0, Hz0), which are evaluated for validity by the offset deriver 30, are found invalid, then ($Hx_{OFF}$, $Hy_{OFF}$, $Hz_{OFF}$) are discarded, and no updating of the offset values ($Hx_{OFF}$, $Hy_{OFF}$, $Hz_{OFF}$) is performed. In the following description, to avoid confusion with the offset values ($Hx_{OFF}$, $Hy_{OFF}$, $Hz_{OFF}$), the ($Hx_{OFF}$, $Hy_{OFF}$, $Hz_{OFF}$) derived in the offset derivation processing are occasionally called the tentative offset values.

As described above, in the offset derivation processing, a curved surface H1 that necessarily passes through an arbitrary one of N data points that are referred to is assumed, and a parameter for minimizing the function value with respect to the curved surface H1 is estimated from the (N−1) other data points. Thus, unlike a method that calculates offset values by direct use of an equation with respect to a spherical surface (for example, the method disclosed in Japanese Patent No. 4391416), the method being discussed does not require complex computation (such as average value computation); it thus helps reduce the amount of computation required for offset value derivation and allows fast and continuous cancellation of offsets.

While the above description deals with a processing method for offset derivation for a case where three-axis magnetism detection data (Hx, Hy, Hz) is the target of offset correction, the method can be applied also in a case where two-axis magnetism detection data (Hx, Hy) is the target of offset correction. In a case where two-axis magnetism detection data (Hx, Hy) is the target of offset correction, the Z-axis coordinate values in the data points P1 to P7, in the imaginary data points P1' to P6', the imaginary offset point C', and the offset point C can all be regarded as zero, and the method can be applied in a two-dimensional planar coordinate system parallel to X and Y axes.

Specifically, one can proceed as follows. One block of magnetism detection data (Hx, Hy) is handled as one data point in a two-axis coordinate system (that is, an XY coordinate system having X and Y axes as the coordinate axes). For two-axis magnetism detection data (Hx, Hy) acquired sequentially as data points in the two-axis coordinate system, N data points are referred to as N evaluation data points. Each evaluation data point can be a data point in the corrected magnetism detection data. In that case, the coordinate values of a data point Pi as an ith evaluation data point are represented by the coordinate values (Hxi, Hyi) of one data point in the corrected magnetism detection data (where i is an integer). That is, the X- and Y-axis coordinate values of the data point Pi are represented by the X-axis coordinate value Hxi and the Y-axis coordinate value Hyi of one data point in the corrected magnetism detection data (where i is an integer). Instead, each evaluation data point can be a data point in the original magnetism detection data. In that case, the coordinate values of a data point Pi as an ith evaluation data point are represented by the coordinate values (Hxi, Hyi) of one data point in the original magnetism detection data (where i is an integer). That is, the X- and Y-axis coordinate values of the data point Pi are represented by the X-axis coordinate value Hxi and the Y-axis coordinate value Hyi of one data point in the original magnetism detection data (where i is an integer).

After the data points P1 to P7 are set, these data points P1 to P7 are translated uniformly such that a reference data point arbitrarily singled out of the data points P1 to P7 coincides with the origin O (0, 0) of the two-axis coordinate system. Here, it is assumed that the data point P7 is singled out as the reference data point. Then, through the translation, except for the reference data point P7, six imaginary data points P1' to P6' are derived and set.

Next, in the two-axis coordinate system, an imaginary offset point C' that minimizes the sum of the distances from a curved line H2 passing through the origin O to the imaginary data points P1' to P6' (the sum of a total of six distances) is found. That is, the coordinate values of an imaginary offset point C' that minimizes the value of the function $F_{H2}$ of a curved line H2 given by formula (2) below are calculated. Here, Hxi' and Hyi' represent respectively the X- and Y-axis coordinate values of the imaginary data point Pi' (where i is any integer, and is here an integer of 1 or more but (N−1) or less), and Hx0' and Hy0' represent respectively the X- and Y-axis coordinate values of the imaginary offset point C'. It is here assumed that the curved line H2 is a circle having its center at the imaginary offset point C' and passing through the origin O (accordingly, the radius of the circle equals the distance from the origin O to the imaginary offset point C').

[Formula 7]

$$F_{H2} = \sum_{i=1}^{6} (Hxi'^2 + Hyi'^2 - 2Hxi' \cdot Hx0' - 2Hyi' \cdot Hy0')^2 \quad (2)$$

Finally, the imaginary offset point C' is translated such that the previously done translation is undone, and thereby the true offset point C is calculated. That is, the point obtained by translating the data point P7 to the origin O and then translating the imaginary offset point C' by the same amount of movement but in the opposite direction is the offset point C. Hx0 and Hy0 represent respectively the X- and Y-axis coordinate values of the offset point C. The (Hx0, Hy0) derived by this method can be substituted in the offset values ($Hx_{OFF}$, $Hy_{OFF}$) (that is, the offset values can be updated) and then fed to the offset corrector 20. However, as in a case considered in terms of three axes, if the derived (Hx0, Hy0), which are evaluated for validity by the offset deriver 30, are found invalid, then ($Hx_{OFF}$, $Hy_{OFF}$) are discarded, and no updating of the offset values ($Hx_{OFF}$, $Hy_{OFF}$) is performed. In the following description, to avoid confusion with the offset values ($Hy_{OFF}$, $Hy_{OFF}$), the ($Hx_{OFF}$, $Hy_{OFF}$) derived in the offset derivation processing are occasionally called the tentative offset values.

<Operation Flow Related to the Updating of Offset Values>

Figure 3:
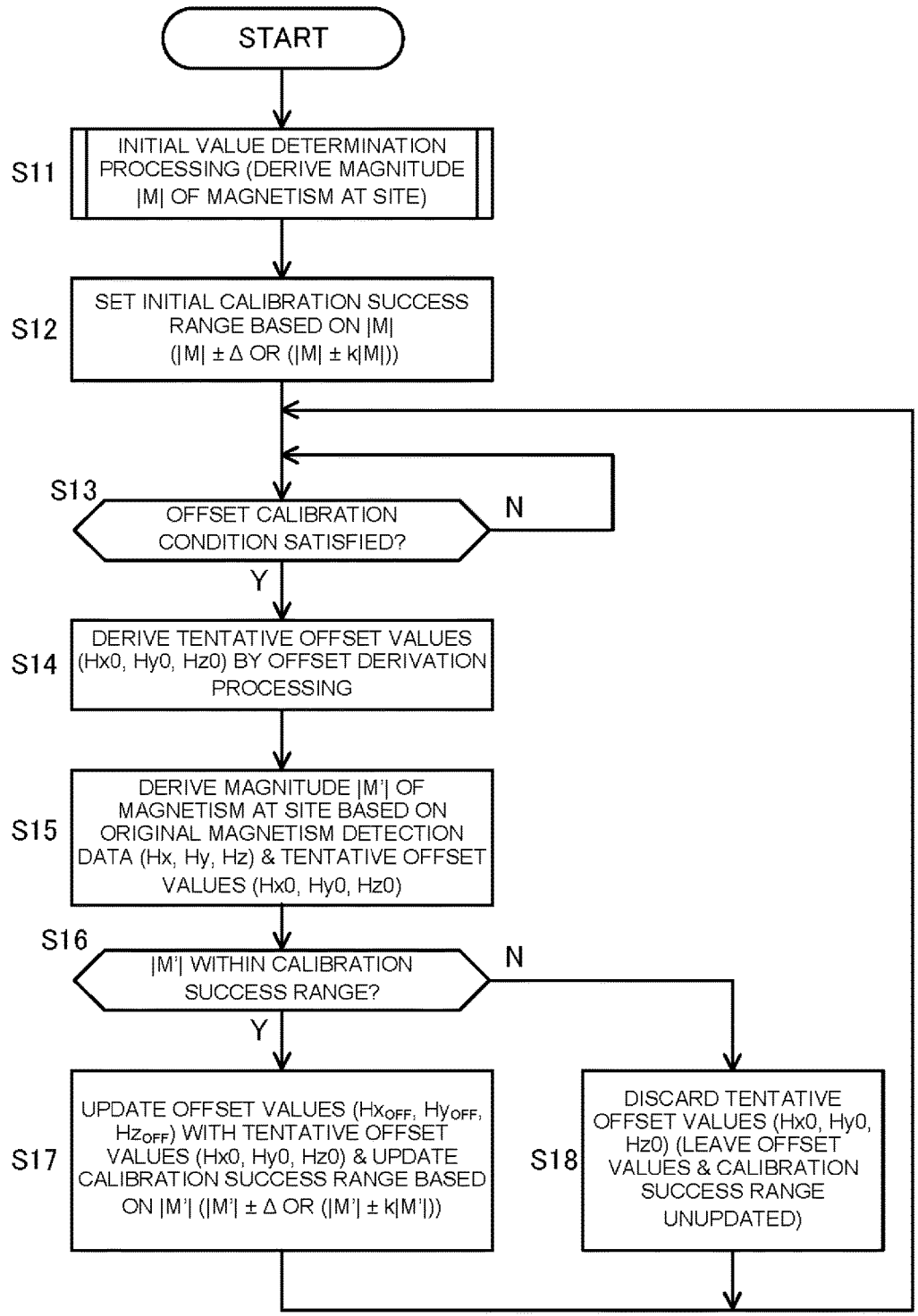
FIG. 3 is a flow chart of operation related to the updating of offset values in the azimuth sensor.

With reference to FIG. 3, the flow of operation related to the updating of offset values in the azimuth sensor 1 will be described. FIG. 3 is a flow chart showing the flow of operation. In the following description, unless expressly stated otherwise, the azimuth sensor 1 handles magnetism detection data in a three-axis coordinate system. In a case where the azimuth sensor 1 handles magnetism detection data in a two-axis coordinate system, all Z-axis components in magnetism detection data and in offset values can be assumed to be zero.

In the operation shown in FIG. 3, first, at step S11, initial value determination processing is performed. Through the initial value determination processing, the magnitude M of the magnetism at the site is derived. The magnitude of the magnetism at the site represents the magnitude of the magnetism at the location where the azimuth sensor 1 is present, and is supposed to be the magnitude of the geomagnetism at the location where the azimuth sensor 1 is present. In the initial value determination processing, an estimated initial value of the magnitude of geomagnetism is found.

Figure 4:
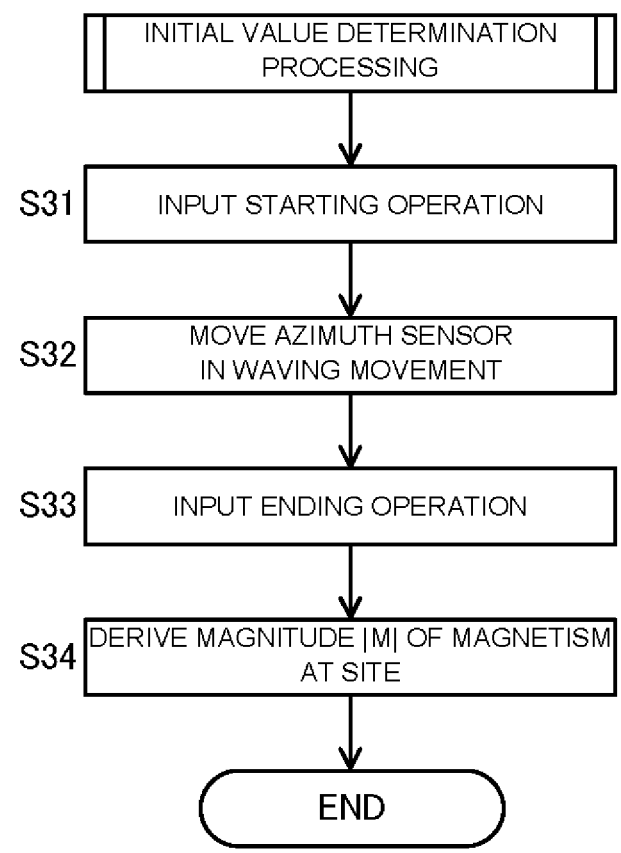
FIG. 4 is a flow chart of the initial value determination processing performed in the azimuth sensor.

FIG. 4 is a flow chart of the initial value determination processing. The initial value determination processing comprises processing at steps S31 through 34. The azimuth sensor 1 or any device (including an electronic device described later) incorporating the azimuth sensor 1 is provided with an operation panel (such as button switches and a touch screen; unillustrated) to accept the input of predetermined operations from the user of the device. At step S31, a predetermined starting operation from the user is input to the operation panel. After this input, at step S32, the user moves the azimuth sensor 1 in a waving movement. Thereafter, at step S33, a predetermined ending operation is input to the operation panel. On accepting the ending operation, then, at step S34, the offset deriver 30 derives the magnitude |M| of the magnetism at the site. The waving movement of the azimuth sensor 1 can be read as the waving movement of any device incorporating the azimuth sensor 1.

The waving movement of the azimuth sensor 1 denotes a predetermined movement involving waving the azimuth sensor 1 freely, for example, in a so-called figure-of-eight motion so as to change variously the relationship of one axis fixed in the real space (for example, an axis parallel to the direction of geomagnetism) with each of the X, Y, and Z axes defined in the azimuth sensor 1. As one typical example, the waving movement can be a combination of a movement (see FIG. 5A) in which, with the azimuth sensor 1 or any device incorporating the azimuth sensor 1 fixed on an hand of the user extended in the horizontal direction, the hand is circled around one turn along the horizontal plane about the center of gravity of the user and a movement (see FIG. 5B) in which, with the azimuth sensor 1 or any device incorporating the azimuth sensor 1 fixed on an hand of the user, the hand is circled around one turn along the vertical plane about an axis passing through the user's shoulder and parallel to the horizontal direction. For example, as shown in FIGS. 6A and 6B, when, in the waving movement, the vector of geomagnetism moves around one turn about the Z axis on the plane parallel to the X and Y axes, in the course of the one turn, Hx and Hy each vary in a sine-wave pattern, taking a maximum and a minimum value.

The offset deriver 30 sets the time span from the time point of input of the starting operation to the time point of input of the ending operation as an initial value determination data time span. Instead, the time span from the time point of input of the starting operation to the time point that a predetermined time (for example, 10 seconds) has elapsed since may be set as an initial value determination data time span. In this case, the input of the ending operation at step S33 is unnecessary. The offset deriver 30, by referring to the bulk of original magnetism detection data (Hx, Hy, Hz) acquired periodically during the initial value determination data time span as an initial value determination data set, identifies the maximum value Hxmax and the minimum value Hxmin in all X-axis data contained in the initial value determination data set, the maximum value Hymax and the minimum value Hymin in all Y-axis data contained in the initial value determination data set, and the maximum value Hzmax and the minimum value Hzmin in all Z-axis data contained in the initial value determination data set. Then the offset deriver 30 calculates the magnitude |M| of magnetism according to formula (3) below. Here, max{ } is an operator that returns the maximum value out of a plurality of arguments (variables) enumerated in { }. Accordingly, one-half of the greatest value out of (Hxmax−Hxmin), (Hymax−Hymin), and (Hzmax−Hzmin) is calculated as |M|.

[Formula 8]

$$|M|=\max\{|H\text{max}-Hx \text{ min}|,|Hy \text{ max}-Hy \text{ min}|,|Hz \text{ max}-Hz \text{ min}|\}/2 \quad (3)$$

Hx, Hy, and Hz are each a one-dimensional quantity with a positive or negative value. When the X-axis component of the vector of geomagnetism extends from the origin of the three-axis coordinate system in the positive or negative direction along the X axis, the sensed Hx has a positive or negative value respectively. A similar description applies to Hy and Hz. Provided that the waving movement is performed properly, in most cases, Hxmax, Hymax, and Hzmax each have a positive value, and Hxmin, Hymin, and Hzmin each have a negative value; ideally, (Hxmax−Hxmin), (Hymax−Hymin), and (Hzmax−Hzmin) all equal the magnitude of the geomagnetism at the site. Depending on the magnitude of an offset, Hxmax and Hxmin can have values of the same sign (a similar description applies to Hymax and Hymin, and to Hzmax and Hzmin).

With reference back to FIG. 3, when the magnitude |M| of the magnetism at the site is derived at step S11, the flow proceeds to step S12. In a case where the azimuth sensor 1 is given, as a prescribed value, the magnitude of the geomagnetism at the site as by use of a GPS (global positioning system), the prescribed value can be handled as |M| to perform the processing at step S12 and the following steps (in this case, the processing at S11 is unnecessary). At step S12, based on the derived magnitude M of magnetism, the offset deriver 30 sets a calibration success range for checking whether or not the offset derivation processing has been performed satisfactorily. The calibration success range will be updated later; what is set at step S12 is an initial calibration success range. For example, a range of which the lower limit is (|M|−Δ) and the upper limit is (|M|+Δ) is set as the initial calibration success range. Instead, a range of which the lower limit is (|M|−k|M|) and the upper limit is (|M|+k|M|) is set as the initial calibration success range. Here, Δ has a predetermined positive value and k has a predetermined positive value less than one (for example, 0.1). The value of Δ can be set appropriately according to the magnitude of geomagnetism as the sensing target (generally 20 to 80 μT; in Japan, outdoors, 40 to 50 μT).

After step S12, the flow proceeds to step S13. At step S13, the offset deriver 30 checks whether or not a predetermined offset calibration condition is satisfied.

Figure 7:
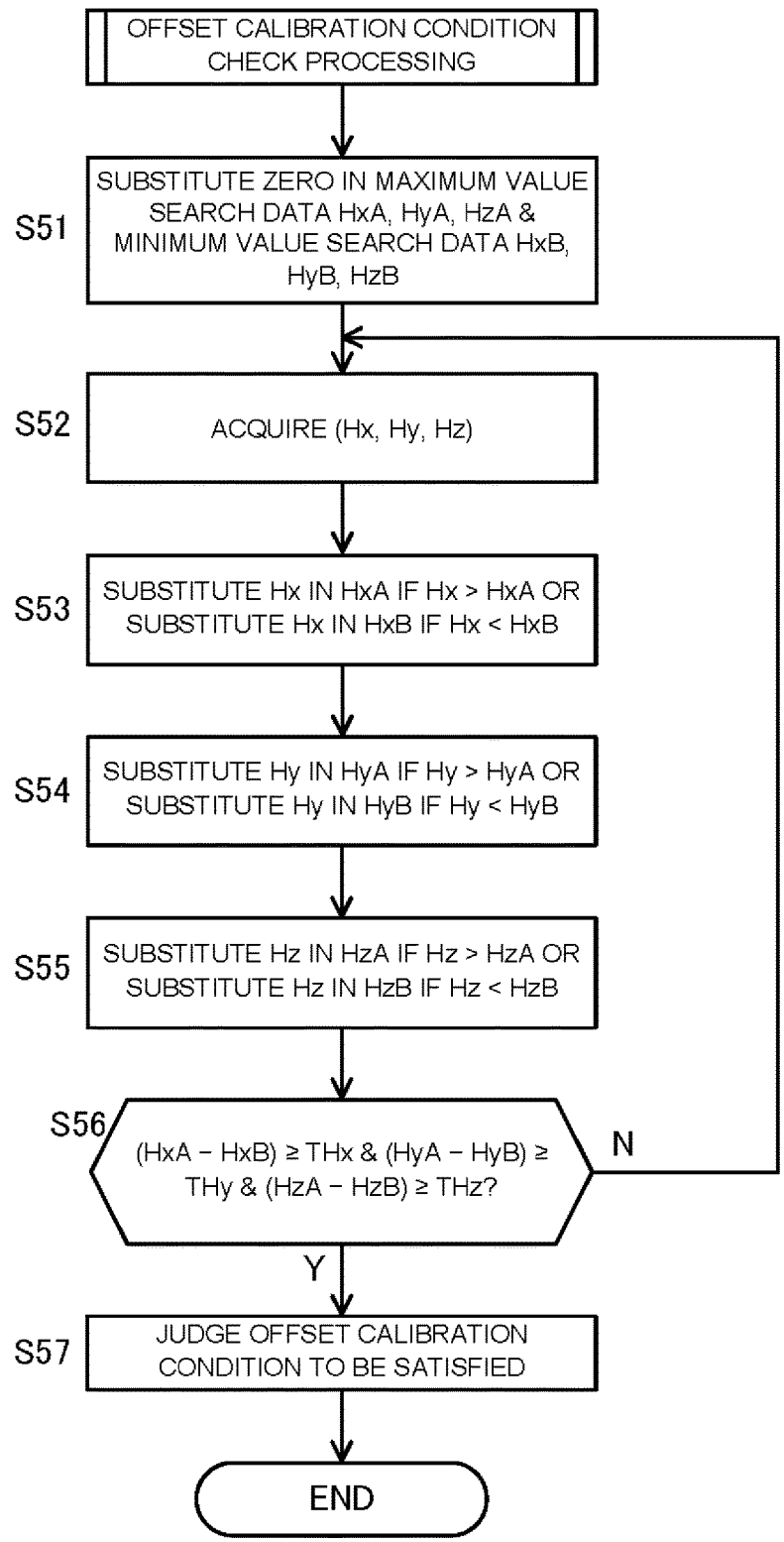
FIG. 7 is a flow chart of the offset calibration condition check processing performed in the azimuth sensor.

FIG. 7 is a flow chart of offset calibration condition check processing performed by the offset deriver 30 to check whether or not an offset calibration condition is satisfied. The offset calibration condition check processing comprises steps S51 through S57. First, at step S51, zero is substituted throughout maximum value search data HxA, HyA, and HzA and minimum value search data HxB, HyB, and HzB. Subsequently, at step S52, the offset deriver 30 acquires the latest magnetism detection data (Hx, Hy, Hz). The magnetism detection data (Hx, Hy, Hz) acquired at step S52 is corrected magnetism detection data, but may instead be original magnetism detection data. In a situation where the processing at step S17 in FIG. 3 has not been performed even once, the offset values ($Hx_{OFF}$, $Hy_{OFF}$, $Hz_{OFF}$) are (0, 0, 0), and thus the corrected magnetism detection data is identical with the original magnetism detection data.

Then, at steps S53 through S55, the offset deriver 30, referring to the magnetism detection data (Hx, Hy, Hz) acquired at step S52, substitutes Hx in HxA if "Hx>HxA" or substitutes Hx in HxB if "Hx<HxB", substitutes Hy in HyA if "Hy>HyA" or substitutes Hy in HyB if "Hy<HyB", and substitutes Hz in HzA if "Hz>HzA" or substitutes Hz in HzB if "Hz<HzB".

Then, at step S56, the offset deriver 30 checks whether or not a first inequality "(HxA−HxB)≥THx", a second inequality "(HyA−HyB)≥THy", and a third inequality "(HzA−HzB)≥THz" hold, and only if the first to third inequalities all hold, the offset deriver 30 judges that the offset calibration condition is satisfied (step S57) and ends the offset calibration condition check processing; otherwise, the flow returns to step S52. THx, THy, and THz are predetermined positive threshold values. That is, through the repetition of steps S52 through S56, with respect to the magnetism detection data (Hx, Hy, Hz) since the start of the offset calibration condition check processing, the maximum value HxA and the minimum value HxB of the X-axis component, the maximum value HyA and the minimum value HyB of the Y-axis component, and the maximum value HxA and the minimum value HxB of the Z-axis component are searched for and updated, and when, for each of the X, Y, and Z axes, the difference between the maximum and minimum values becomes equal to or larger than the predetermined threshold value, it is judged that the offset calibration condition is satisfied.

The threshold values THx, THy, and THz are preferably set at, for example, about 30 μT with consideration given to the magnitude of geomagnetism as the sensing target (generally 20 to 80 μT; in Japan, 40 to 50 μT). The threshold values THx, THy, and THz may all have the same value, or may have different values from each other.

With reference back to FIG. 3, when the check at step S13 is repeated (step S13, N) until the offset calibration condition is satisfied, that is, when the offset calibration condition is satisfied (step S13, Y), the flow proceeds to step S14, where the offset derivation processing described above is performed. That is, when, for each of the X, Y, and Z axes, the difference between the maximum and minimum values becomes equal to or larger than the predetermined threshold value, it is judged that a group of evaluation data points suitable for use in the offset derivation processing (a group of data points dispersed comparatively evenly about the offset point C in the three-axis coordinate system) has been collected, and the offset derivation processing is performed. By adopting this algorithm, it is possible to suppress a situation where inappropriate offset derivation results are obtained from a group of unevenly distributed data points, and thus to enhance the reliability of the offset derivation processing.

Figure 8:
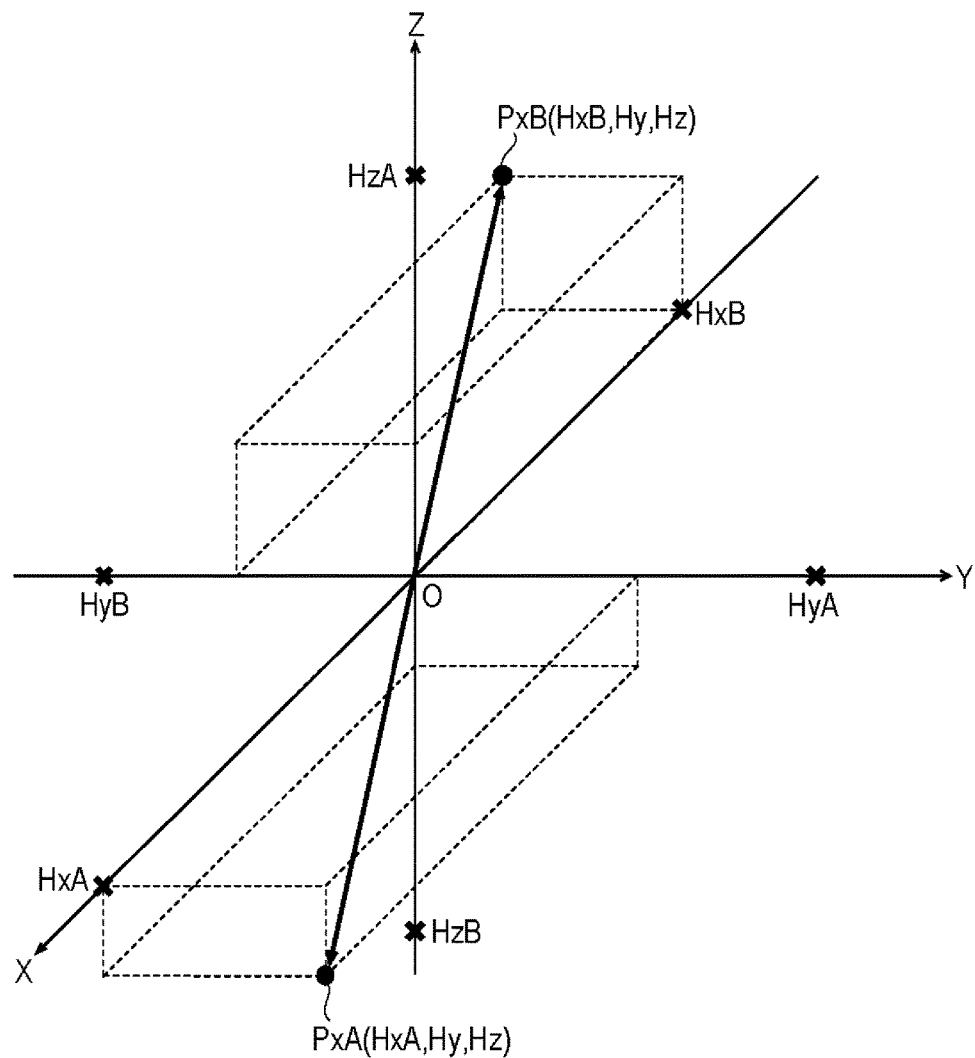
FIG. 8 is a diagram showing the maximum and minimum data points identified in the offset calibration condition check processing.

At the time that the offset calibration condition is satisfied, the data points (HxA, Hy, Hz), (Hx, HyA, Hz), and (Hx, Hy, HzA) that give the maximum values HxA, HyA, and HzA for the individual axes are called the maximum data points, and the data points (HxB, Hy, Hz), (Hx, HyB, Hz), and (Hx, Hy, HzB) that give the minimum values HxB, HyB, and HzB for the individual axes are called the minimum data points. FIG. 8 shows, as an example, the maximum data point PxA and the minimum data point PxB for the X axis.

In the offset derivation processing at step S14, six of the seven evaluation data points are the six data points that give HxA, HyA, HzA, HxB, HyB, and HzB. That is, at the time that the first to third inequalities mentioned above are all satisfied, the blocks of the magnetism detection data (HxA, Hy, Hz) and (HxB, Hy, Hz) that have HxA and HxB as the X-axis component are taken as a first and a second evaluation data point, the blocks of the magnetism detection data (Hx, HyA, Hz) and (Hx, HyB, Hz) that have HyA and HyB as the Y-axis component are taken as a third and a fourth evaluation data point, and blocks of the magnetism detection data (Hx, Hy, HzA) and (Hx, Hy, HzB) that have HzA and HzB as the Z-axis component are taken as a fifth and a sixth evaluation data point. The first, third, and fifth evaluation data points are the maximum data points for the X, Y, and Z axes respectively, and the second, fourth, and sixth evaluation data points are the minimum data points for the X, Y, and Z axes respectively. That is, the data points used in actual computation in the offset derivation processing at step S14 consist of the first to six evaluation data points comprising the maximum and minimum data points for the three axes and a one arbitrary point (corresponding to the reference data point mentioned above) different from any of them. Thus, the offset deriver 30 has only to be provided with registers for a total of seven points, and this helps reduce the circuit scale or the software code size.

The magnetism detection data as the first to sixth evaluation data points referred to in the offset derivation processing at step S14 is that acquired at step S52 in FIG. 7, and is therefore the corrected magnetism detection data or the original magnetism detection data. In a case where the first to sixth evaluation data points are data points in the corrected magnetism detection data, the seventh evaluation data point also is a data point in the corrected magnetism detection data, and in a case where the first to sixth evaluation data points are data points in the original magnetism detection data, the seventh evaluation data point also is a data point in the original magnetism detection data.

Figure 9:
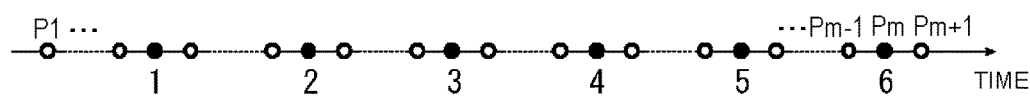
FIG. 9 is a diagram illustrating an example of the reference data point selected for use in the offset derivation processing.

FIG. 9 is a timing chart showing one example of selection of the reference data point that is translated to the origin (0, 0, 0). In FIG. 9, black dots represent the maximum and minimum data points (a total of six) corresponding to the maximum and minimum values for the three axes, and hollow dots represent other data points. For example, in a case where, as shown in FIG. 9, while the maximum and minimum values for the three axes are searched for from a data point P1 to a data point Pm (where m is an integer), the first to third inequalities noted above are satisfied at the time point that the data point Pm is acquired and thus the maximum and minimum data points for the three axes are all determined definitively, it is preferable, from the viewpoint of making easiest the algorithm for selecting the reference data point, to select as the reference data point the data point Pm+1 (that is, the seventh evaluation data point) that is acquired immediately after the data point Pm. However, it is also possible to select any one of the data points P1 to Pm−1 (excluding any maximum or minimum data point) as the reference data point.

With reference back to FIG. 3, in the offset derivation processing at step S14, based on the first to seventh evaluation data points, tentative offset values (Hx0, Hy0, Hz0) are derived. The first to seventh evaluation data points correspond to the data points P1 to P7 in FIG. 2. The significance of the tentative offset values and how they are derived are as described already.

Subsequent to step S14, at step S15, the offset deriver 30 finds the magnitude of the magnetism at the site according to formula (4) below based on the latest original magnetic detection data (Hx, Hy, Hz) and the tentative offset values (Hx0, Hy0, Hz0). In a case where the first to seventh evaluation data points are data points in the original magnetism detection data, |M'| may be found based on the data (Hx, Hy, Hz) of one of the first to seventh evaluation data points and the tentative offset values (Hx0, Hy0, Hz0). In a case where the first to seventh evaluation data points are data points in the corrected magnetism detection data, |M'| may be found based on the original magnetism detection data (Hx, Hy, Hz) corresponding to one of the first to seventh evaluation data points and the tentative offset values (Hx0, Hy0, Hz0). |M'| represents the magnitude of the magnetism of the site on the assumption that the tentative offset values are true offset values. When the tentative offset values are assumed to be true offset values, the magnetism detection data after offset correction is (Hx−Hx0, Hy−Hy0, Hz−Hz0), and thus the magnitude of the magnetism |M| is given by formula (4) below.

[Formula 9]

$$|M'|=\sqrt{(Hx-Hx0)^2+(Hy-Hy0)^2+(Hz-Hz0)^2} \quad (4)$$

The group of evaluation data points set through the offset calibration condition check processing described above is expected to be a group of evaluation data points that is suitable for use in the offset derivation processing (a group of evaluation data points that are dispersed comparatively evenly about the offset point C). However, the set group of evaluation data points may accidentally contain an inappropriate data point (for example, a data point that momentarily suffered an intense influence of electric noise or an external magnetic field), and in that case, a larger error arises between the tentative offset values and the true offset values. A large error between the tentative offset values and the true offset values leads to an abnormally large or small value of |M'|. On the other hand, the magnitude of geomagnetism as the sensing target is considered not to change much in a comparatively short time span; even if the magnitude changes, it is considered to change continuously and gradually. Accordingly, in a case where, as compared with the magnitude of magnetism derived last time, the magnitude of magnetism derived this time exhibits a large change, it can be judged that the error between the tentative offset values and the true offset values is so large as to exceed a permissible range.

To check whether or not the error is within the permissible range, subsequently to step S15, at step S16, the offset deriver 30 checks whether or not |M'| falls within a calibration success range. In a situation where the updating processing at step S17, which will be described later, has not been performed even once, the calibration success range set at step S12 is used at step S16. If the |M'| found at step S15 is within the calibration success range (step S16, Y), the flow proceeds to step S17; if the |M'| found at step S15 falls outside the calibration success range (step S16, N), the flow proceeds to S18. For example, in a configuration where the lower and upper limits of the calibration success range are "|M|−Δ" and "|M|+Δ" respectively, when the inequality "|M|−Δ≤|M'|≤|M|+Δ" is satisfied, the flow proceeds to step S17, and when the inequality is not satisfied, the flow proceeds to step S18.

At step S17, the offset deriver 30 judges that the accuracy of the tentative offset values (Hx0, Hy0, Hz0) found in the offset derivation processing is good (judges that those tentative offset values are valid); the offset deriver 30 thus updates the offset values (Hx$_{OFF}$, Hy$_{OFF}$, Hz$_{OFF}$) fed to the offset corrector 20 with the tentative offset values (Hx0, Hy0, Hz0), and also updates the calibration success range based on the magnitude |M|' of magnetism found at step S15. Specifically, for example, the lower and upper limits of the calibration success range are updated with (|M|−Δ) and (|M'|+Δ) respectively, or the lower and upper limits of the calibration success range are updated with (|M'|−k|M'|) and (|M'|+k|M'|) respectively. After the updating of the offset values and of the calibration success range at step S17, the flow returns to step S13.

At step S18, the offset deriver 30 judges that the accuracy of the tentative offset values (Hx0, Hy0, Hz0) found in the offset derivation processing is poor (judges that those tentative offset values are invalid); the offset deriver 30 thus does not update the offset values (Hx$_{OFF}$, Hy$_{OFF}$, Hz$_{OFF}$) fed to the offset corrector 20 but discards the tentative offset values (Hx0, Hy0, Hz0), and does not update the calibration success range, either. After the discarding of the tentative offset values at step S18, the flow returns to step S13.

When the flow returns to step S13 via step S17 or S18, the check of whether or not the offset calibration condition is satisfied is performed once again, and here the offset calibration condition check processing (see FIG. 7) for performing that check is started from step S51 (that is, HxA etc. are reset to zero).

Figure 10:
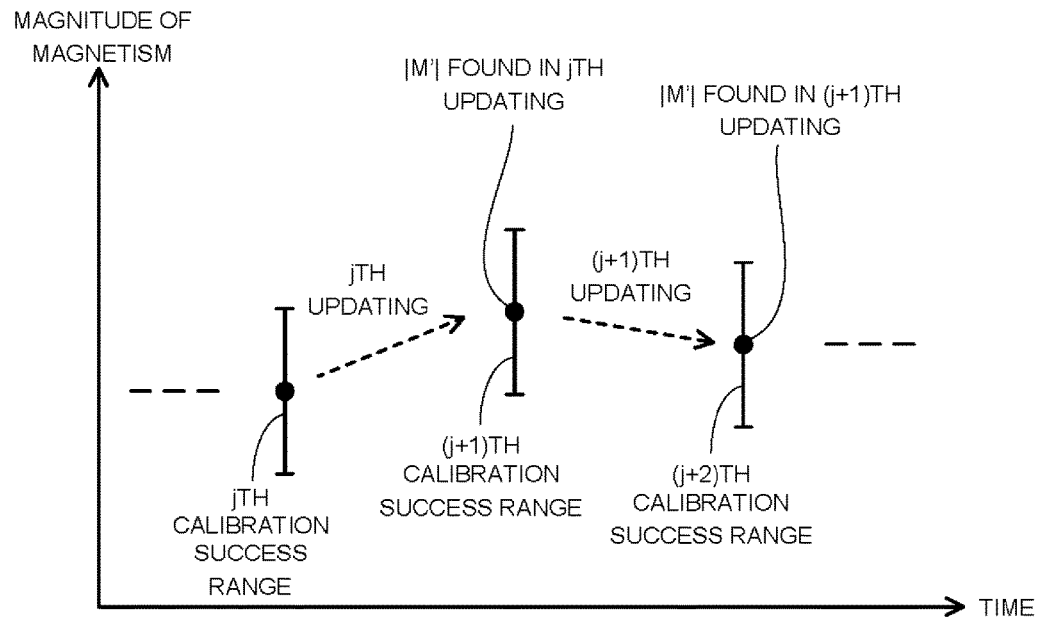
FIG. 10 shows how a calibration success range continues to be updated successively.

Through the repetition of steps S13 through S17, the offset values ($Hx_{OFF}$, $Hy_{OFF}$, $Hz_{OFF}$) and the calibration success range are updated successively. As shown in FIG. 10, in a jth session of updating, the calibration success range is updated from a jth calibration success range to a (j+1)th calibration success range (where j is an integer). Suppose that the jth session of updating is performed as a result of the |M'| found with given timing falling in the calibration success range. Then, the (j+1)th calibration success range is set based on the |M'| found with the given timing (that is, the found in the jth session of updating). Specifically, the (j+1)th calibration success range is set to be a range that includes the |M'| found with the given timing. With the method described above, the center of the (j+1)th calibration success range is the |M'| found with the given timing; however, the center of the (j+1)th calibration success range may deviate slightly from the |M'| found with the given timing.

With the method according to this embodiment, an offset in the azimuth sensor 1, which constantly changes both temporally and spatially, can be kept being canceled fast and continuously. It is thus possible to sense the azimuth accurately. Meanwhile, in a situation where the accuracy of the results of offset derivation processing is temporarily poor under the influence of noise or the like (electric noise, or magnetic noise due to an external magnetic field), the results of offset derivation processing (that is, tentative offset values) are discarded so as not to be used in actual offset correction. It is thus possible to prevent even temporary deterioration of the accuracy of offset values (and hence the accuracy of the azimuth).

In step S14 described above, an arbitrary point other than any of the maximum and minimum data points for the three axes is selected as the reference data point. Instead, the reference data point may be one of the maximum and minimum data points for the three axes. With this configuration, it is possible to reduce by one the number of data points used in actual computation in the offset derivation processing, and it is thus possible to further reduce the circuit scale or the software code size. When this configuration is adopted, however, depending on the distribution of the maximum and minimum data points for the three axes, the accuracy of offset calculation may deteriorate.

Figure 11:
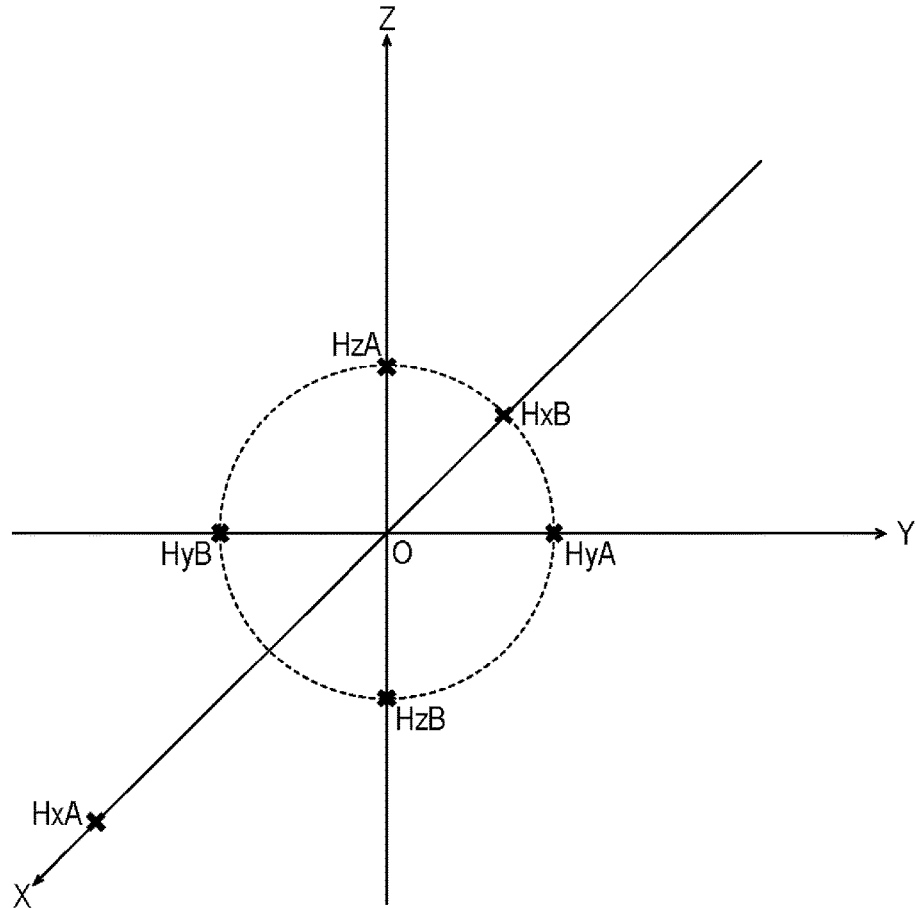
FIG. 11 is a diagram showing how an appropriate data point is included in the maximum and minimum data points identified in the offset calibration condition check processing.

FIG. 11 is a three-axis coordinate space diagram in illustration of points to keep in mind in selecting one of the maximum and minimum data points for the three axes as the reference data point. Under the influence of an external magnetic field or the like, one of the maximum and minimum data points for the three axes (in FIG. 11, the maximum value HxA of the X-axis component) may deviate greatly from the other. If one of the maximum and minimum data points that deviates greatly from the rest is selected as the reference data point, the amount of translation for making the reference data point coincide with the origin O deviates greatly from what it should be. This may make it difficult to obtain the correct offset point C by offset derivation processing. To avoid this inconvenience, it is preferable to take measures such as excluding, from candidates for the selection of the reference data point, those data points which correspond to, of the absolute values of the maximum values HxA, HyA, and HzA and the minimum values HxB, HyB, and HzB defining the maximum and minimum data points for the three axes, the largest and smallest absolute values.

Figure 12:
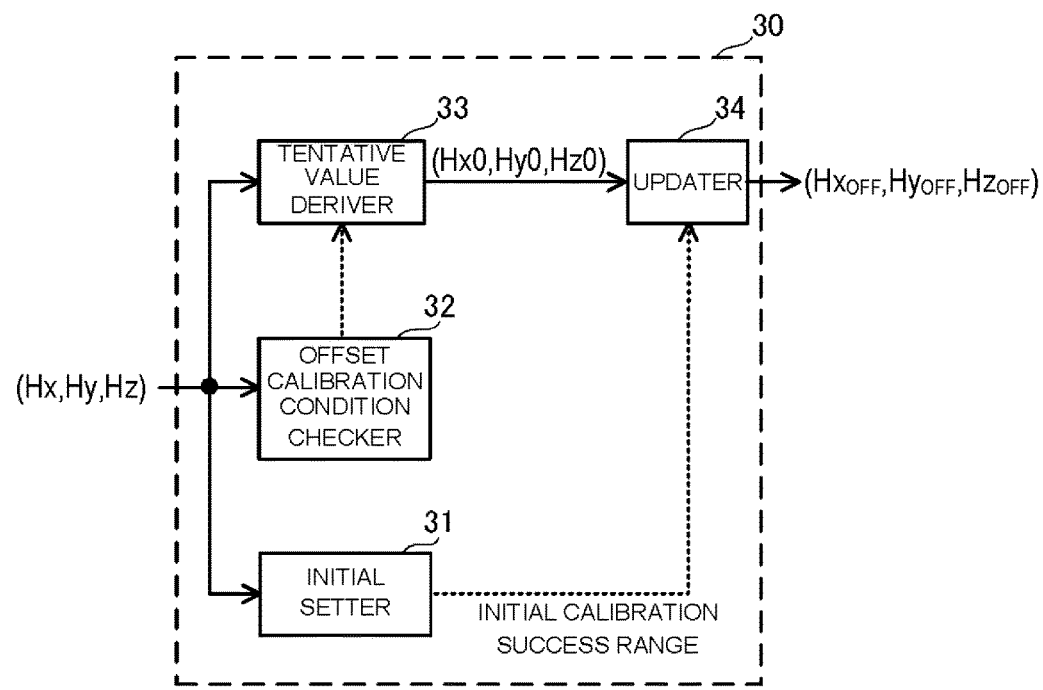
FIG. 12 is an internal block diagram of the offset deriver in FIG. 1.

FIG. 12 shows an internal block diagram of the offset deriver 30. The offset deriver 30 can be grasped as including an initial setter 31 which performs the processing at steps S11 and 12, an offset calibration condition checker 32 which performs processing at step S13 (and hence the offset calibration condition check processing in FIG. 7), a tentative value deriver 33 which performs the processing at step S14, and an updater 34 which performs the processing at steps S15 through S18.

The offset derivation processing described above is merely one method of deriving tentative offset values by use of a plurality of data points in original magnetism detection data or in corrected magnetism detection data. The tentative offset values in this embodiment may instead be derived by use of any other method of deriving offset values for original magnetism detection data by use of a plurality of data points in the original magnetism detection data or in corrected magnetism detection data (for example, the method disclosed in Japanese Patent registered as No. 4391416).

<Application to Electronic Devices>

Figure 29:
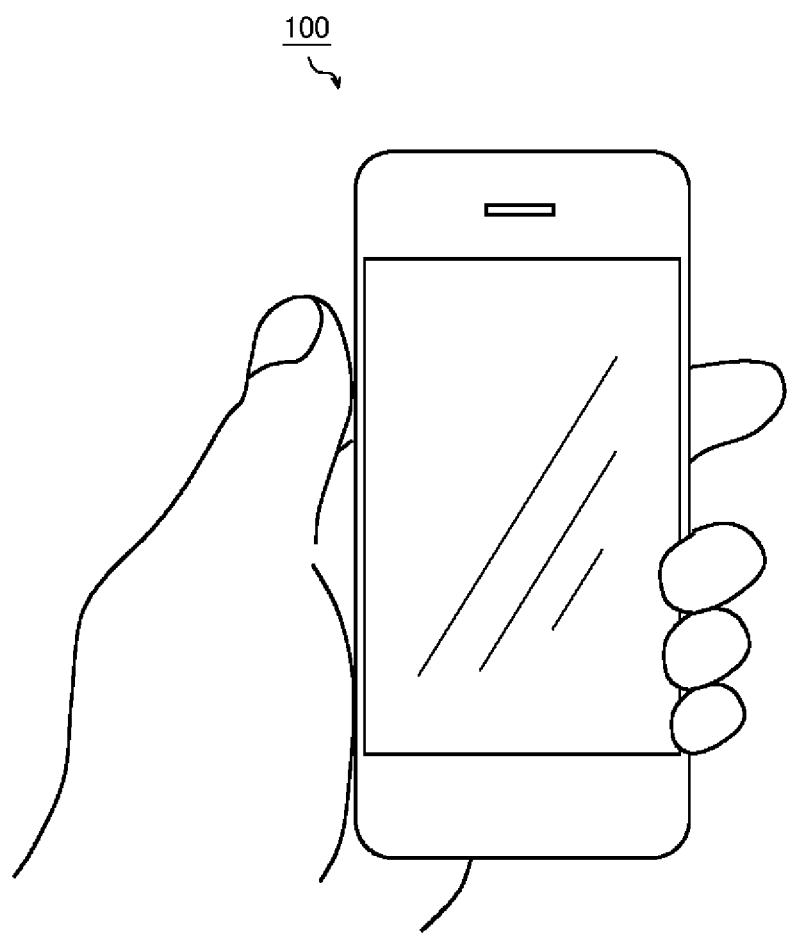
FIG. 29 is an exterior view of a smartphone.
Figure 30:
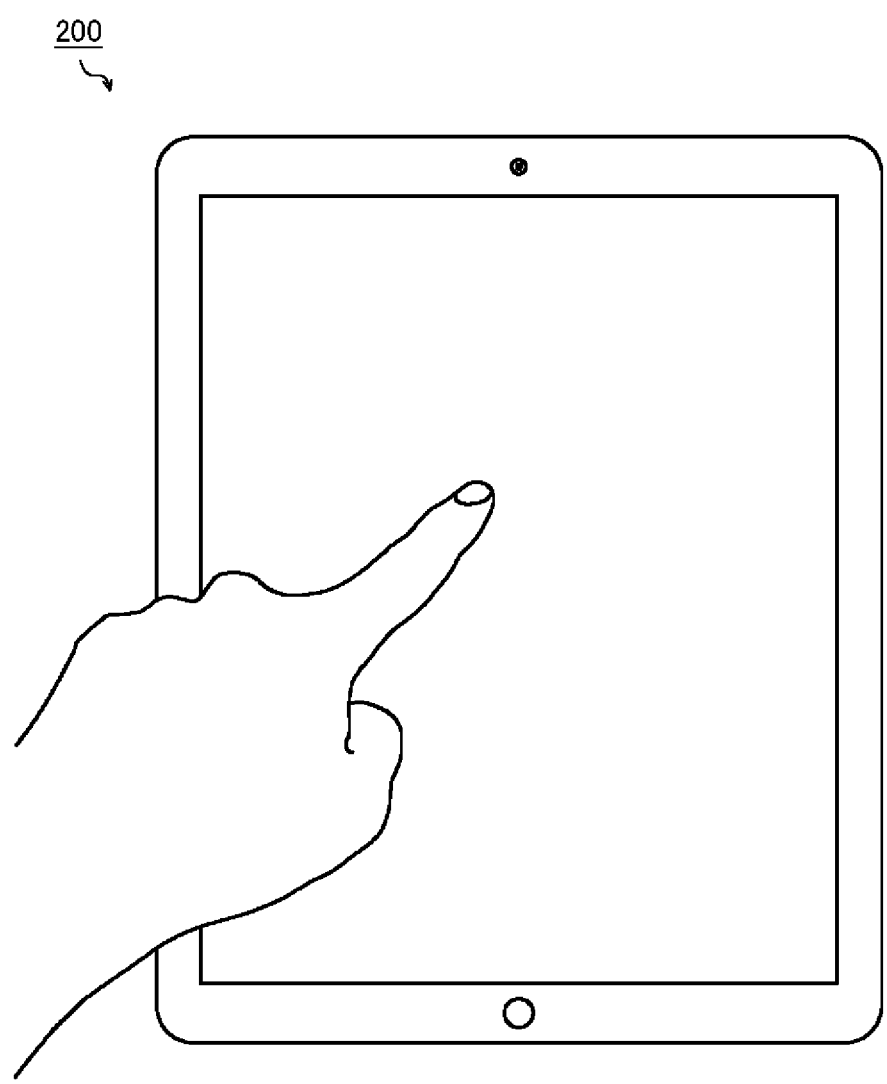
FIG. 30 is an exterior view of a tablet computer.
Figure 31:
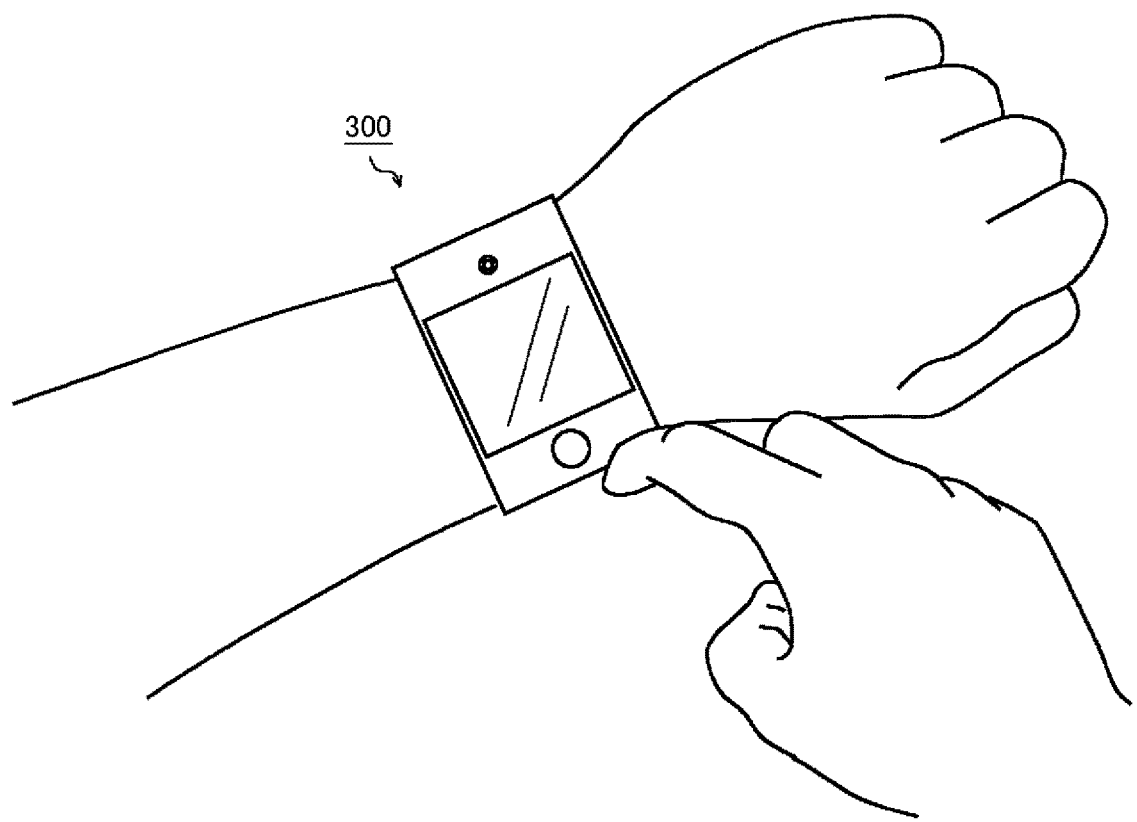
FIG. 31 is an exterior view of a smartwatch.
Figure 32:
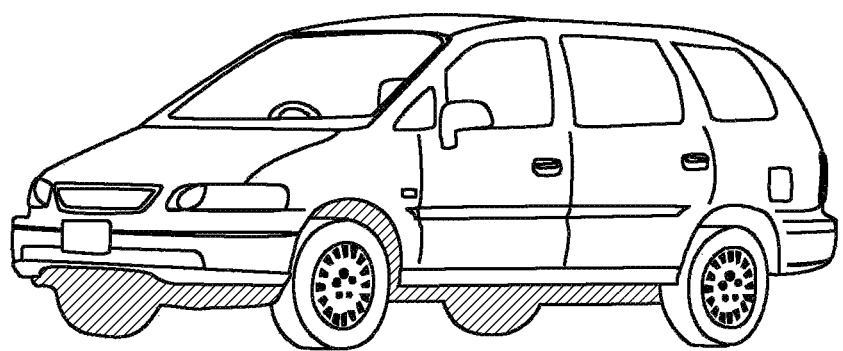
FIG. 32 is an exterior view of a vehicle.

The azimuth sensor 1 can be incorporated in any device such as an electronic device. Electronic devices that can incorporate the azimuth sensor 1 include, for example, mobile telephones (including mobile telephones classified into so-called smartphones), portable information terminals (including portable information terminals classified into so-called tablet computers), watches (including watches classified into so-called smartwatches), digital cameras, and pedometers. FIGS. 29, 30, and 31 are exterior views of a smartphone 100, a tablet computer 200, and a smartwatch 300 each incorporating the azimuth sensor 1. Incorporating the azimuth sensor 1 as an electronic compass of an electronic device makes it possible to accurately sense the direction in which the electronic device and the user point (more specifically, the relationship between the direction of the X axis and the direction of geomagnetism). In particular, using the electronic compass in combination with a GPS (global positioning system) makes it possible to enhance the accuracy of location sensing in map application software and navigation application software.

<Studies on the Present Invention>

To follow are studies on the present invention as implemented in the first embodiment described above.

An offset derivation device $W_1$ according to one aspect of the present invention is an offset derivation device (30) that derives an offset value for generating corrected magnetism detection data by correcting original magnetism detection data acquired sequentially as data points in a three- or two-axis coordinate system through the sensing of magnetism along three or two axes, and includes: a tentative value deriver (33) configured to calculate a tentative value of the offset value (a tentative offset value) by using a plurality of data points (a first to an Nth evaluation data point; for example, P1 to P7) in the original or corrected magnetism detection data; and an updater (34) configured to derive the magnitude (|M'|) of the magnetism based on the original magnetism detection data and the tentative value, the updater being configured, if the derived magnitude of the magnetism is within a predetermined reference range (calibration success range), to update the offset value with the tentative value (S17) and otherwise to keep the offset value unupdated (S18).

Magnetism detection data often contains an offset, and the offset constantly varies both temporally and spatially. To keep canceling the offset that constantly varies both temporally and spatially, an offset value for generating corrected magnetism detection data needs to be updated successively. However, when the offset value is derived, the accuracy of the derived result may be temporarily poor under the influence of noise and the like. If the offset value is updated even in such a situation, the corrected magnetism detection data that has undergone correction based on the offset value contains a larger error (an error from true values).

With the offset derivation device $W_1$, it is possible to first derive a tentative value of the offset value by using a plurality of data points and then judge whether or not the tentative value is appropriate based on the original magnetism detection data and the tentative value through the derivation of the magnitude of magnetism. In this way, it is possible to update the offset value if the tentative value is appropriate (that is, if the derived magnitude of magnetism is within a predetermined reference range), and to keep the offset value unupdated if the tentative value is not appropriate. It is thus possible to suppress even a temporary decline in the accuracy of the offset value.

<Modifications Etc.>

Embodiments of the present invention allow for many modifications within the scope of the technical concepts recited in the appended claims. The embodiments described above merely present examples of how the present invention can be implemented, and the senses of the terms used to describe the present invention and its features are not limited to those in which the terms are used in the description of the embodiments. Any specific values mentioned in the above description are merely examples, and, needless to say, can be changed to many different values.

A target device, that is, an offset derivation device or an electronic device according to the present invention, can be built as software, or as hardware, such as an integrated circuit, or as a combination of hardware and software. Any particular functions, which are all or part of the functions performable by the target device, may be written in a program, and this program may be stored in a flash memory that can be mounted on the target device so that, when the program is run on a program execution device (for example, a microprocessor that can be mounted on the target device), those particular functions will be performed. The program can be stored in or fixed to any recording medium. The recording medium in or to which the program is stored or fixed may be mounted on or connected to a device (such as a server device) separate from the target device.

Second Embodiment

Next, a second embodiment of the present invention will be described in detail.

<Overall Configuration>

Figure 13:
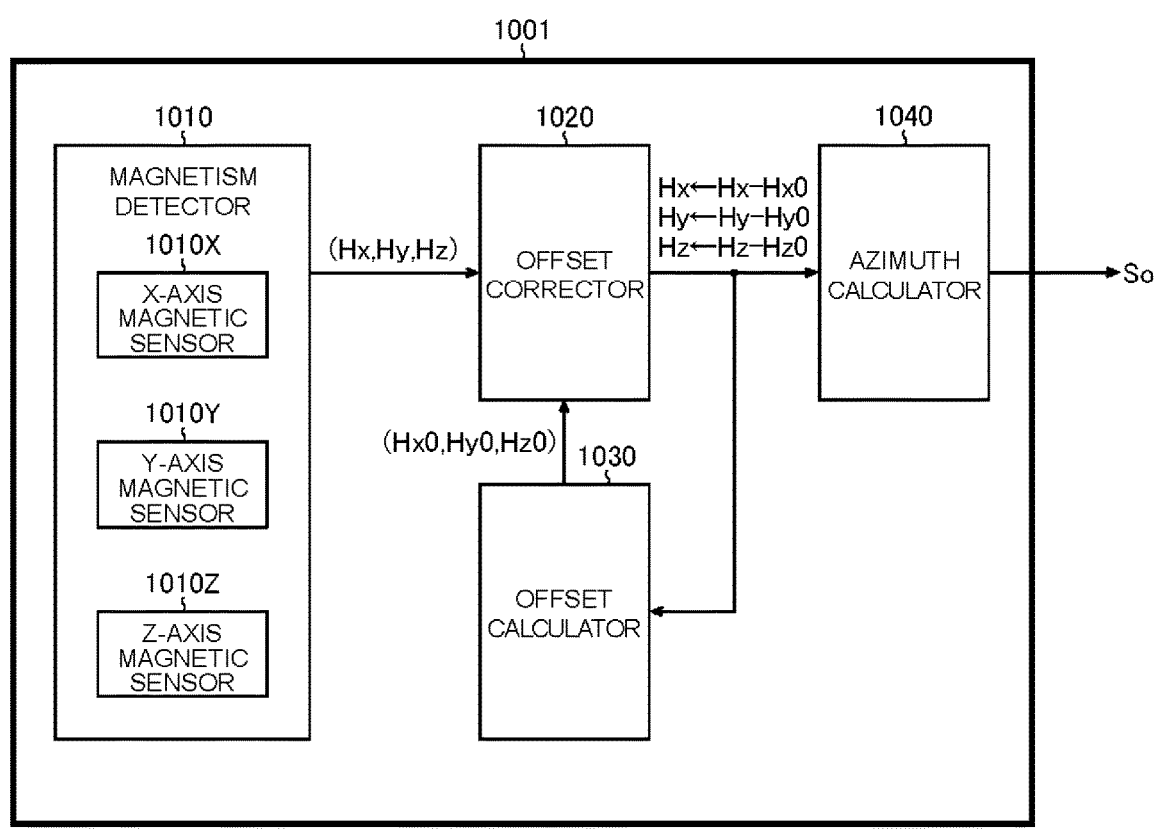
FIG. 13 is a block diagram showing the overall configuration of an azimuth sensor according to a second embodiment of the present invention.

FIG. 13 is a block diagram showing the overall configuration of an azimuth sensor 1001 according to a second embodiment of the present invention. The azimuth sensor 1001 of this configuration example includes a magnetism detector 1010, an offset corrector 1020, an offset calculator 1030, and an azimuth calculator 1040.

The magnetism detector 1010 includes a magnetic sensor 1010X that senses magnetism in the X-axis direction, a magnetic sensor 1010Y that senses magnetism in the Y-axis direction, and a magnetic sensor 1010Z that senses magnetism in the Z-axis direction, and generates three-axis magnetism detection data (Hx, Hy, Hz). As magnetism sensing devices in the magnetic sensors 1010X, 1010Y, and 1010Z respectively, for example, Hall-effect devices can be used, or MR (magnetoresistance) devices can be used. The X, Y, and Z axes can be designed to be perpendicular to each other.

The offset corrector 1020 corrects the magnetism detection data (Hx, Hy, Hz) by using offset values (offset components (Hx0, Hy0, Hz0) contained in the three-axis magnetism detection data (Hx, Hy, Hz) respectively) calculated in the offset calculator 1030. The offset calculation processing proceeds such that Hx←Hx−Hx0, Hy←Hy−Hy0, and Hy←Hz−Hz0, the arrow sign "←" indicating substitution of the right side in the left side.

The offset calculator 1030 constantly monitors the magnetism detection data (Hx, Hy, Hz) that has undergone offset correction, and regularly updates the offset values (Hx0, Hy0, Hz0) in the magnetism detector 1010. The offset calculation processing (offset updating processing) will be described in detail later.

The azimuth calculator 1040 generates azimuth data So from the magnetism detection data (Hx, Hy, Hz) that has undergone offset correction.

Although, in FIG. 13, the offset corrector 1020, the offset calculator 1030, and the azimuth calculator 1040 are shown each as an independent processing block, these processing blocks may be implemented in a centralized fashion by use of a CPU (central processing unit) or DSP (digital signal processor).

Offset Calculation Processing (First Example)

Figure 14:
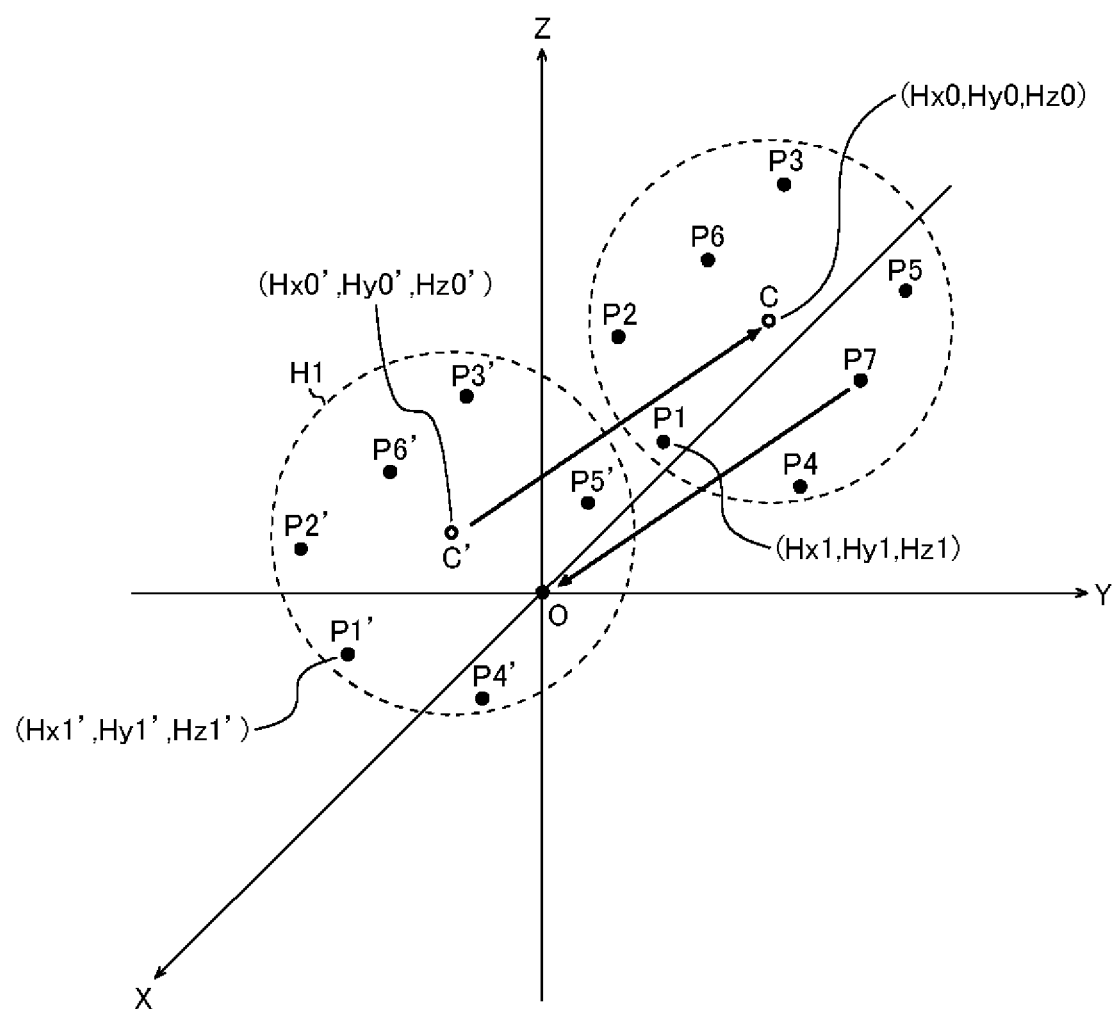
FIG. 14 is an XYZ coordinate space diagram showing a first example of offset calculation processing.

FIG. 14 is an XYZ coordinate space diagram showing a first example of the offset calculation processing in the offset calculator 1030. In the offset calculation processing of the first example, with respect to three-axis magnetism detection data (Hx, Hy, Hz) acquired sequentially as data points in the three-axis coordinate space, N data points (where N≥2; in the illustrates example, a total of seven points comprising data points P1 to P7 (N=7)) are referred to. Incidentally, where the magnetism detector 10 provides high accuracy, it is possible to obtain sufficient offset calculation accuracy without unnecessarily increasing the number of evaluation data points referred to.

Next, the data points P1 to P7 are translated uniformly such that a reference data point arbitrarily singled out of the data points P1 to P7 coincides with the origin O (0, 0, 0). In the illustrated example, the data point P7 is singled out as the reference data point. Through the translation, except for the reference data point P7, six (=N−1) imaginary data points P1' to P6' are calculated.

Next, an imaginary offset point C' that minimizes the sum of the distances from a curved surface H1 passing through the origin O to the individual imaginary data points P1' to P6' is found. Specifically, when the imaginary data point Pi' is (Hxi', Hyi', Hzi') (in the illustrated example, i=1 to 6), and the imaginary offset point C' is (Hx0', Hy0', Hz0'), an imaginary offset point C' that minimizes the value of the function of a curved surface H1 given by formula (5) below is calculated.

[Formula 10]

$$H1 = \Sigma_i (Hxi'^2 + Hyi'^2 + Hzi'^2 - 2Hxi' \cdot Hx0' - 2Hyi' \cdot Hy0' - 2Hzi' \cdot Hz0')^2 \quad (5)$$

The function of the curved surface H1 given by formula (5) above is derived on the assumption that the spherical surface with a radius r about the imaginary offset point C' as its center passes through the origin O (r=|OC'|).

Finally, the imaginary offset point C' is translated such that the previously done translation is undone, and thereby the true offset point C (Hx0, Hy0, Hz0) (corresponding to the offset values in the magnetism detector 1010) is calculated.

In this way, in the offset calculation processing of this example, a computation method is adopted whereby the function of a curved surface H1 that necessarily passes through an arbitrary one of N data points referred to is assumed and a parameter for minimizing its value is estimated from the other (N−1) data points.

Accordingly, unlike a method that calculates offset values by direct use of an equation of a spherical surface, the method being discussed does not require complex computation (such as average value computation); it thus helps reduce the amount of computation required for offset correction processing and allows fast and continuous cancellation of offsets.

While the above detailed description deals with an example where three-axis magnetism detection data (Hx, Hy, Hz) is the target of offset correction, the offset calculation method described above can be applied also in a case where two-axis magnetism detection data (Hx, Hy) is the target of offset correction.

In that case, an imaginary offset point C' that minimizes the sum of the distances from a curved line H2 passing through the origin O to individual imaginary data points Pi' can be calculated. More specifically, when the imaginary offset point C' is (Hxi', Hyi') and the imaginary offset point C' is (Hx0', Hy0'), an imaginary offset point C' that minimizes the function of a curved line H2 given by formula (6) below can be calculated

[Formula 11]

$$H2 = \Sigma_i (Hxi'^2 + Hyi'^2 - 2Hxi' \cdot Hx0' - 2Hyi' \cdot Hy0')^2 \quad (6)$$

Offset Calculation Processing (Second Example)

Figure 15:
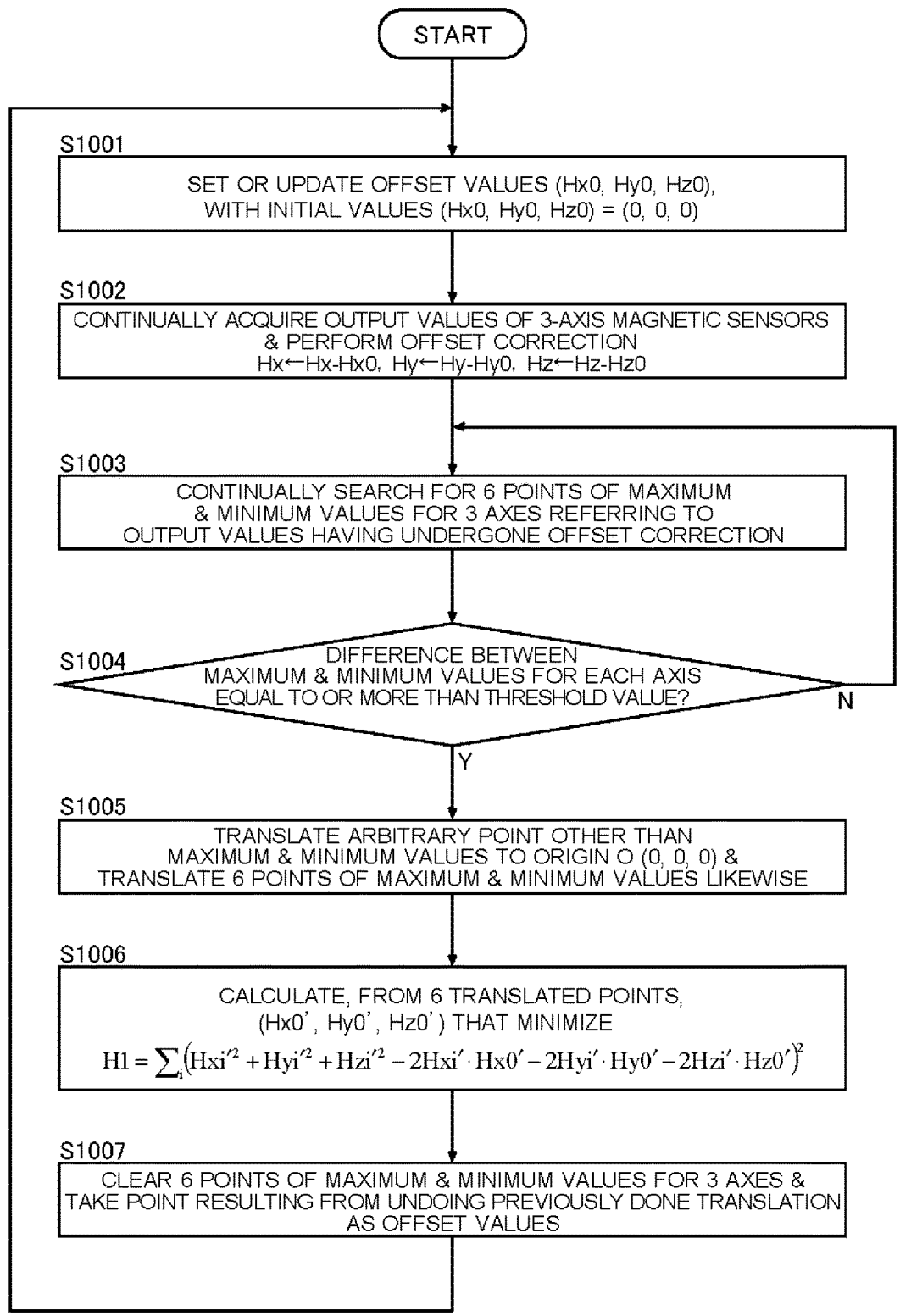
FIG. 15 is a flow chart showing a second example of offset calculation processing.

FIG. 15 is a flow chart showing a second example of the offset calculation processing in the offset calculator 1030. In the offset calculation processing of the second example, prior to execution of the offset calculation processing of the first example (in the chart, corresponding to steps S1005 through S1007), preprocessing (in the chart, corresponding to steps S1001 through S1004) for determining a group of data points appropriate as a reference target is introduced. This will be described in detail below step by step. Unless expressly stated otherwise, it is assumed that the agent of the steps is the offset calculator 1030.

First, at step S1001, offset values (Hx0, Hy0, Hz0) are set or updated. The initial values are (0, 0, 0).

Next, at step S1002, three-axis magnetism detection data (Hx, Hy, Hz) is acquired continually, and it is subjected to offset correction (Hx←Hx−Hx0, Hy←Hy−Hy0, Hz←Hz−Hz0). The agent of this step S1002 is the offset corrector 1020.

Next, at step S1003, while the magnetism detection data (Hx, Hy, Hz) having undergone offset correction is referred to, six maximum and minimum values for the three axes are searched for continually.

Figure 16:
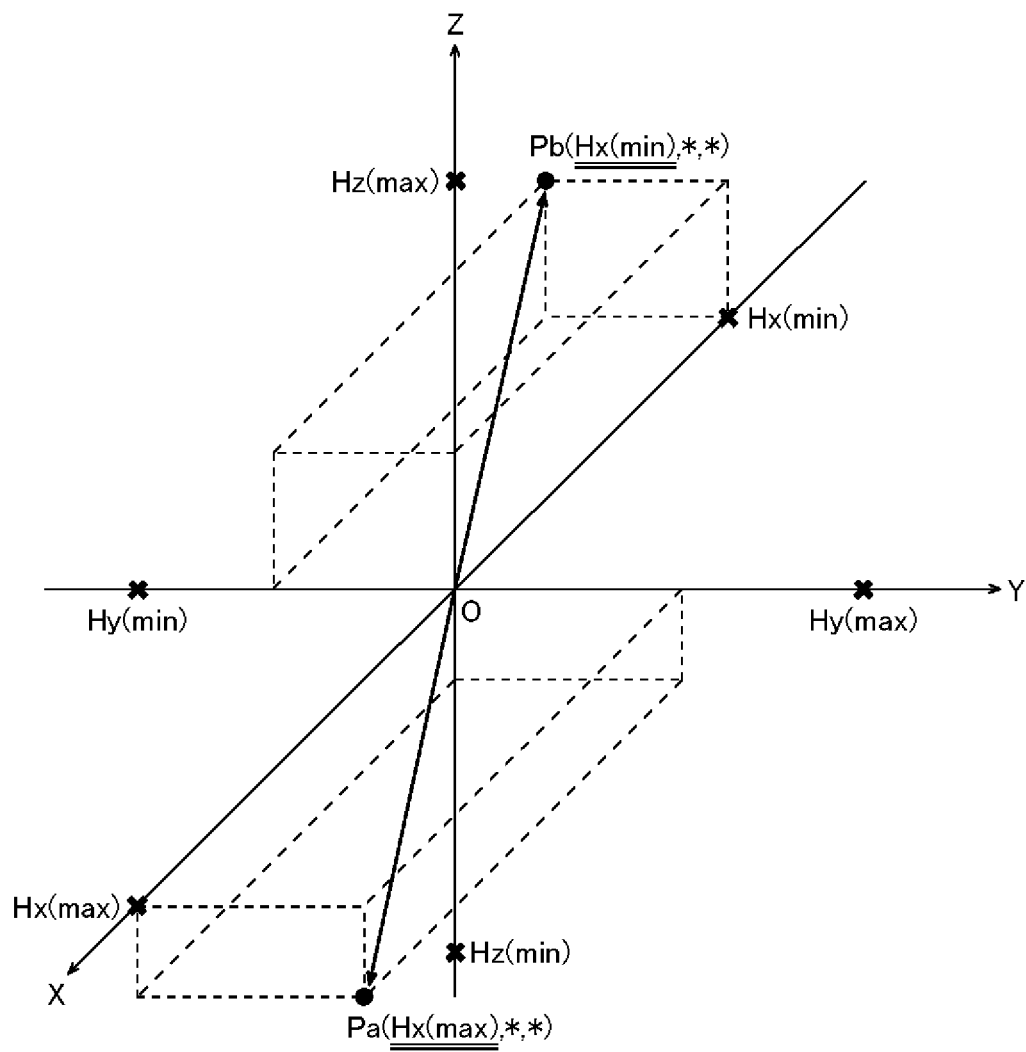
FIG. 16 is an XYZ coordinate space diagram showing the maximum and minimum values for three axes.

FIG. 16 is an XYZ coordinate space diagram showing the maximum and minimum values for the three axes. In the illustrated example, the maximum value of the X-axis component is Hx(max), and the X-axis maximum data point corresponding to it is Pa(Hx(max), *, *). On the other hand, the minimum value of the X-axis component is Hx(min), and the X-axis minimum data point corresponding to it is Pb(Hx(min), *, *).

Though not expressly shown in the diagram, there exist, also for the other axes, maximum data points and minimum data points similar to the ones mentioned above, that is, those corresponding to the maximum value Hy(max) and the minimum value Hy(min) of the Y-axis component and the maximum value Hz(max) and the minimum value Hz(min) of the Z-axis component.

With reference back to FIG. 15, a description of the flow continues. At step S1004, it is checked, for each axis, whether the difference ΔHx, ΔHy, or ΔHz between the maximum and minimum values is equal to or larger than a threshold value. For example, if ΔHx≥THx and ΔHy≥THy and ΔHz≥THz, the result is Yes; if any one of the just-noted inequalities is not satisfied, the result is No. At step S1004, if the result is Yes, the flow proceeds to step S1005, and if the result is No, the flow returns to step S1003.

The threshold values THx, THy, and THz are preferably set at, for example, about 30 μT with consideration given to the magnitude of geomagnetism as the measurement target (generally 20 to 80 μT; in Japan, 40 to 50 μT). The threshold values THx, THy, and THz may all have the same value, or may have different values from each other.

When step S1004 results in No, the flow loops between steps S1003 and 1004. That is, until the differences ΔHx, ΔHy, and ΔHz for the individual axes are all equal to or larger than the threshold values, the maximum and minimum values for the three axes continue to be searched for.

Figure 17:
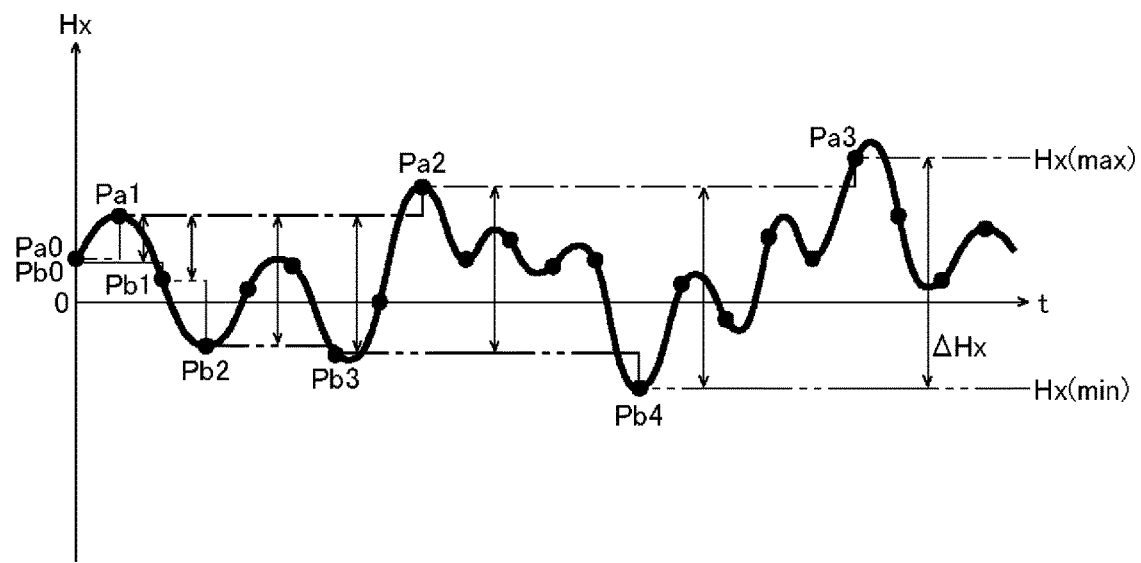
FIG. 17 is a timing chart showing the changing behavior of a difference ΔHx.

FIG. 17 is a timing chart showing the changing behavior of the difference ΔHx for the X axis. By referring to the data points indicated by the signs Pa0 to Pa3 and Pb0 to Pb4, one can see how the X-axis maximum data point Pa and the X-axis minimum data point Pb are updated sequentially with the passage of time. The difference ΔHx for the X axis, quite naturally, increases each time at least either of the maximum value Hx(max) and the minimum value Hx(min) of the X-axis component is updated.

With reference back to FIG. 15, a description of the flow continues. When step S1004 results in Yes, the offset calculation processing of the first example described previously (corresponding to steps 1005 through S1007 in the chart) is executed. That is, in the offset calculator 1030, when the differences between the maximum and minimum values for the individual axes are all equal to or larger than the threshold values, it is judged that a group of data points suitable as a reference target in offset calculation (a group of data points considered to be dispersed comparatively evenly about the offset point C in the XYZ coordinate system) has been collected, and the offset calculation processing described previously is performed.

By adopting this algorithm, it is possible to reduce proactively the risk of obtaining inappropriate offset calculation results from a group of unevenly distributed data points, and thus to enhance the reliability of the offset calculation processing.

At step S1005, as one step of the offset calculation processing described previously, the maximum and minimum data points of the individual axes are translated such that one arbitrary point other than any of the maximum and minimum data points of the individual axes is translated to the origin O (0, 0, 0).

That is, the data points used in actual computation in the offset calculation processing of the second example consist of six maximum and minimum data points for the individual axes and one arbitrary point (corresponding to the reference data point mentioned above) different from any of them. Thus, the offset calculator 1030 has only to be provided with registers for a total of seven points, and this helps greatly reduce the circuit scale or the software code size compared with the conventional configuration that requires 10 or more data points.

Figure 18:
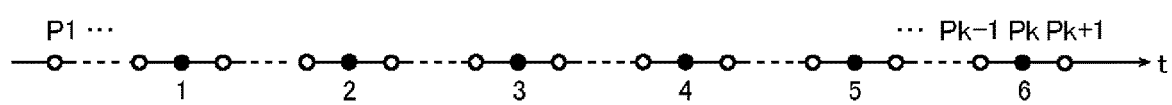
FIG. 18 is a timing chart showing an example of the reference data point selected to be translated to the origin O.

FIG. 18 is a timing chart showing one example of selection of the reference data point that is translated to the origin (0, 0, 0). Black dots in the chart represent the maximum and minimum data points (a total of six) corresponding to the maximum and minimum values for the three axes. On the other hand, hollow dots in the chart represent data points other than those six points.

For example, in a case where, as shown in the chart, while the maximum and minimum values for the three axes are searched for from a data point P1 to a data point Pk, the maximum and minimum data points for the individual axes are all determined definitively, it is preferable, from the viewpoint of making easiest the algorithm for selecting the reference data point, to select, as the reference data point, a data point Pk+1 that is acquired immediately after the data point Pk. However, there is no reason to avoid selecting any one of the data points P1 to Pk−1 (excluding any maximum or minimum data point) as the reference data point.

With reference back to FIG. 15, a description of the flow continues. At step S1006, from the six points that have undergone translation at step S1005, an imaginary offset point C' (Hx0', Hy0', Hz0') that minimizes the function of a curved surface H1 given by formula (5) noted previously is calculated. This proceeds as described previously, and therefore no overlapping description will be repeated.

Next, at step S1007, the six maximum and minimum values for the three axes are cleared, and an offset point C(Hx0, Hy0, Hz0) resulting from undoing the previously done translation is calculated as the offset values in the magnetism detector 1010.

Thereafter, the flow returns to step S1001, so that the sequence of processing described above is repeated. As a result, an offset in the azimuth sensor 1, which constantly changes both temporally and spatially, can be kept being canceled fast and continuously. It is thus possible to sense the azimuth accurately.

The above description deals with an example where, at step S1005 mentioned above, one arbitrary point other than any of the maximum and minimum data points for the individual axes is selected as the reference data point that is translated to the origin O (0, 0, 0). Instead, the reference data point may be any one of the maximum and minimum data points for the individual axes. With this configuration, it is possible to reduce by one the number of data points used in actual computation in offset calculation processing, and it is thus possible to further reduce the circuit scale or the software code size. When this configuration is adopted, however, depending on the distribution of the maximum and minimum data points for the individual axes, the accuracy of offset calculation may deteriorate.

Figure 19:
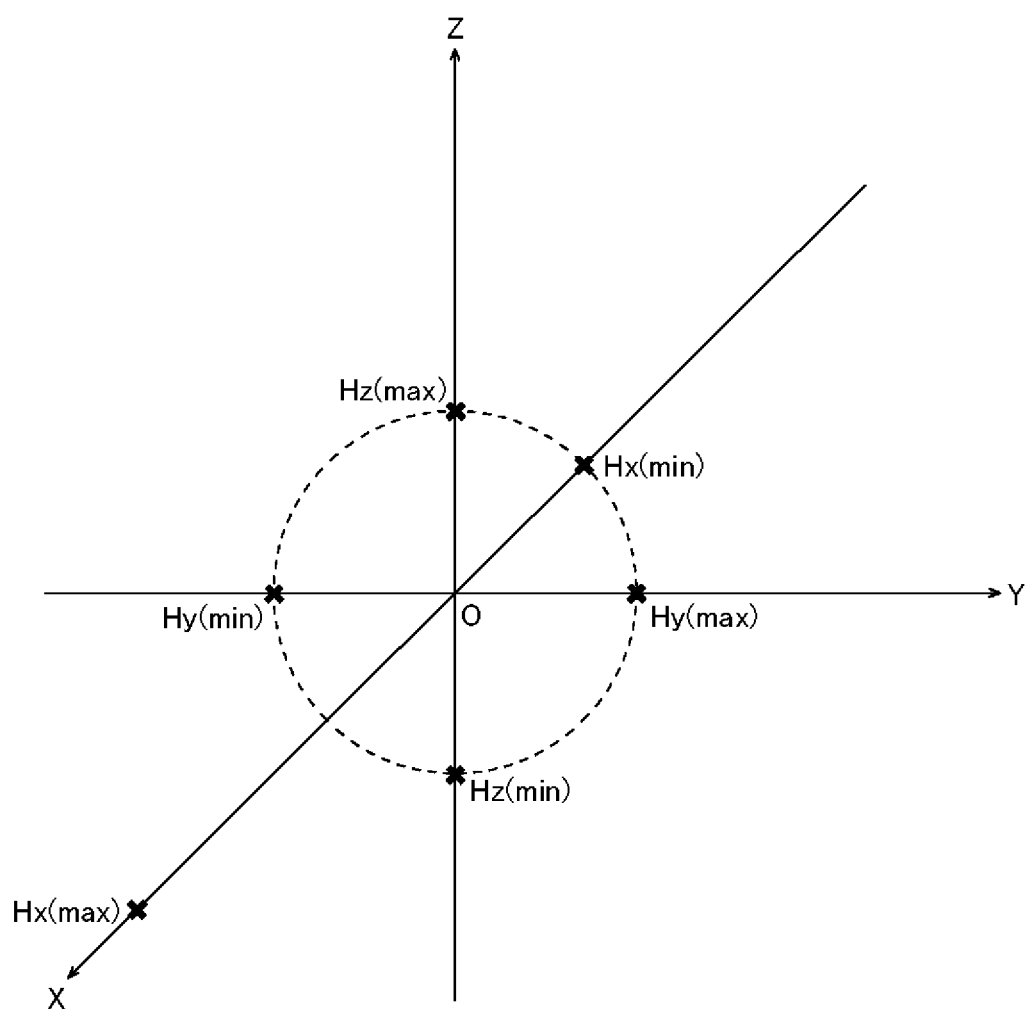
FIG. 19 is an XYZ coordinate space diagram in illustration of points to keep in mind when selecting a data point corresponding to one of the maximum and minimum values for the three axes as a reference data point.

FIG. 19 is an XYZ coordinate space diagram in illustration of points to keep in mind in selecting a data point corresponding to one of the maximum and minimum values for the three axes as the reference data point. Under the influence of an external magnetic field or the like, one of the maximum and minimum values for the individual axes (in the illustrated example, the maximum value Hx(max) of the X-axis component) may deviate greatly from the other.

If one of the maximum and minimum data points that deviates greatly from the rest is selected as the reference data point, the amount of translation for making the reference data point coincide with the origin O deviates greatly from what it should be. This may make it difficult to obtain the correct offset point C (Hx0, Hy0, Hz0) through the offset calculation processing described above.

To avoid this inconvenience, it is preferable to take measures such as excluding, from candidates for the selection of the reference data point, those of the six data points corresponding to the maximum and minimum values for the three axes whose respective axis components have the largest and smallest absolute values.

Offset Calculation Processing (Third Example)

In the offset calculation processing of the first and second examples described above, to obtain a correct offset point C (Hx0, Hy0, Hz0), the azimuth sensor 1001 (and hence the three-axis magnetic sensors 1010X to 1010Z) needs to be moved greatly in the directions of the individual axes in an XYZ coordinate system.

However, for example, in a case where the azimuth sensor 1001 is employed as an electronic compass in a vehicle that travels on the earth's surface, movement in the vertical-axis direction with respect to the earth's surface (=the up-down direction of the vehicle) is expected to be not so large as movement in the horizontal-axis direction with respect to the earth's surface (=the front-rear and left-right directions of the vehicle). Accordingly, magnetism detection data along the vertical axis (for example, Z axis) does not exhibit not very large differences between the maximum and minimum values, and thus, with the algorithms described thus far, it is difficult to calculate the offset point C (Hx0, Hy0, Hz0) accurately.

In view of the above, novel algorithms will be proposed below that permit accurate calculation of an offset point C (Hx0, Hy0, Hz0) even in a case where the variation width of the magnetism detection data of one of the three-axis magnetic sensors 1010X, 1010Y, and 1010Z is small.

Figure 20:
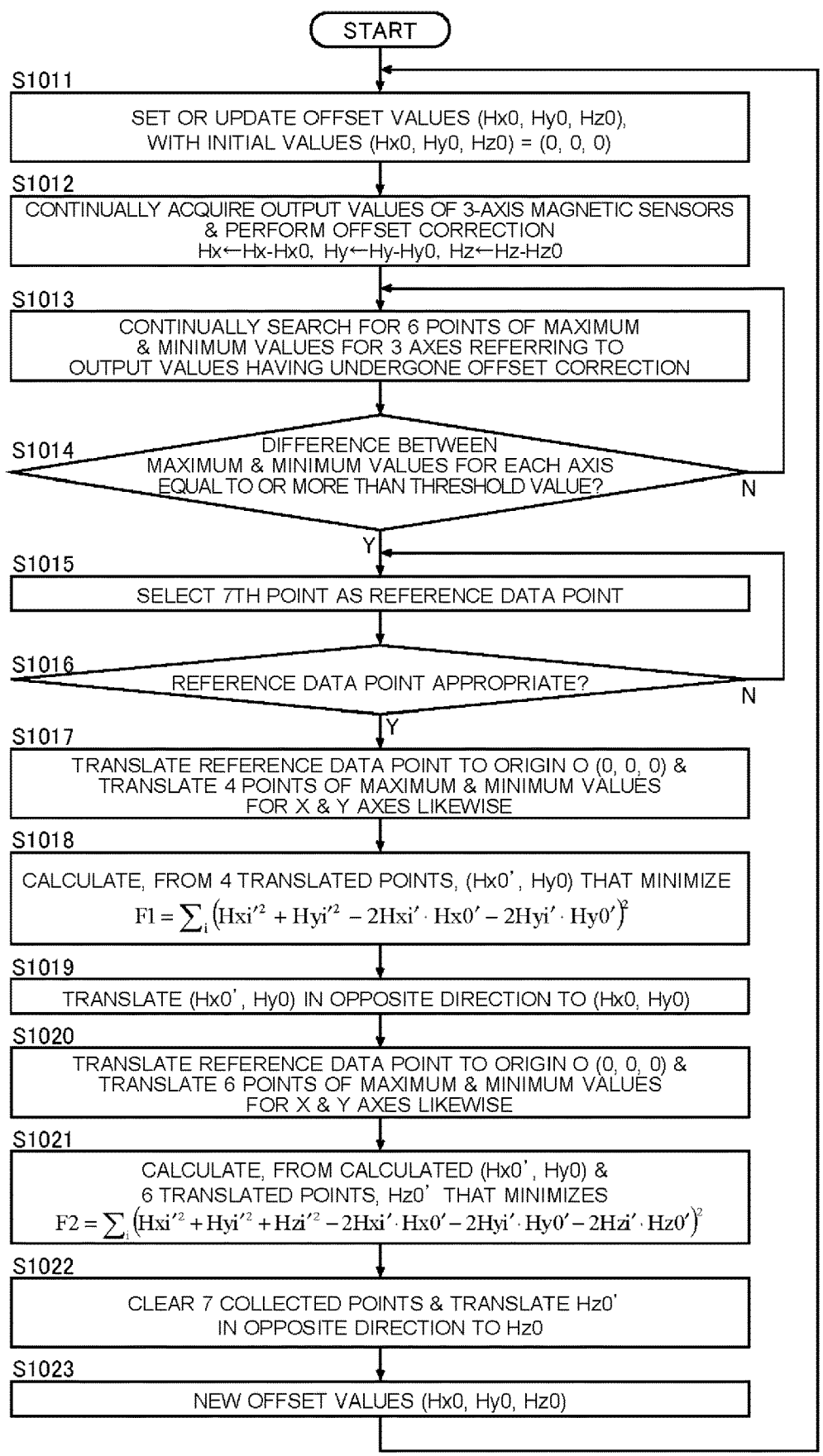
FIG. 20 is a flow chart showing a third example of offset calculation processing.

FIG. 20 is a flow chart showing a third example of the offset calculation processing. The offset calculation processing of the third example is based on the offset calculation processing of the second example (FIG. 15) and is characterized in that offset calculation for the X and Y axes (for example, horizontal axes with respect to the earth's surface) and offset calculation for the Z axis (for example, a vertical axis with respect to the earth's surface) are performed separately. This will be described in detail below step by step. Unless expressly stated otherwise, it is assumed that the agent of the steps is the offset calculator 1030.

First, at step S1011, offset values (Hx0, Hy0, Hz0) are set or updated. The initial values are (0, 0, 0).

Next, at step S1012, three-axis magnetism detection data (Hx, Hy, Hz) is acquired continually, and it is subjected to offset correction (Hx←Hx−Hx0, Hy←Hy−Hy0, Hz←Hz−Hz0). The agent of this step S1012 is the offset corrector 1020.

Next, at step S1013, while the magnetism detection data (Hx, Hy, Hz) having undergone offset correction is referred to, six data points Pi (Hxi, Hyi, Hzi) (where i=1 to 6) corresponding respectively to the maximum and minimum values for the individual axes are searched for continually (see, as necessary, FIGS. 14 and 16 referred to previously).

Next, at step S1014, it is checked, for each axis, whether the difference ΔHx, ΔHy, or ΔHz between the maximum and minimum values is equal to or larger than a threshold value. For example, if ΔHx≥THx and ΔHy≥THy and ΔHz≥THz, the result is Yes; if any one of the just-noted inequalities is not satisfied, the result is No. At step S1004, if the result is Yes, the flow proceeds to step S1015, and if the result is No, the flow returns to step S1013.

The threshold values THx to THz can be set separately for the individual axes respectively, for example, based on the magnitude of the geomagnetism at the site (hence the magnetism of the spatial magnetic field at the site), or based on the XY-plane component |HXY| and the Z-axis component HZ into which it breaks down. This will be discussed in detail later.

When step S1014 results in Yes, the flow loops between steps S1013 and 1014. That is, until the difference ΔHx, ΔHy, and ΔHz for the individual axes are all equal to or larger than the threshold values, the maximum and minimum values for the three axes continue to be searched for.

On the other hand, when the step S1014 results in Yes, then, at step S1015, a seventh reference data point P7 (Hx7, Hy1, Hz7) different from any of the data points P1 to P6 is selected.

Next, at step S1016, it is checked whether or not the reference data point P7 is appropriate. More specifically, in this step, it is checked whether or not, as the reference data point P7, a data point that is at a predetermined distance or more from, of the data points P1 to P6, at least four points corresponding respectively to the maximum and minimum values for the X and Y axes is selected. Here, if the result is Yes, the flow proceeds to step S1017. On the other hand, if the result is No, the flow returns to step S1015, so that re-selection of the reference data point P7 is repeated until the above-mentioned condition is satisfied.

When step S1016 results in Yes, then, at step S1017, of the data points P1 to P6, the four points corresponding respectively to the maximum and minimum values for the X and Y axes are translated evenly such that the reference data point P7 coincides with the origin O (0, 0, 0), while the Z-axis coordinate values are ignored, so that imaginary data points Pi' (Hxi', Hyi') (where i=1 to 4) on the XY coordinate plane are calculated.

In the example described above, of the data points P1 to P6, the two points corresponding respectively to the maximum and minimum values for the Z axis are excluded from the target of translation. However, in a case where the difference ΔHz for the Z axis is smaller than a predetermined value, it is believed to be unlikely that the X- and Y-axis components of the just-mentioned two points deviate greatly from the maximum and minimum values for the respective axes. Accordingly, in that case, the above-mentioned six points may all be taken as the target of translation. It is also possible to take four points as the target of translation when the difference ΔHz is larger than a switching threshold value, and to take six points as the target of translation when the difference ΔHz is smaller than the switching threshold value.

Next, at step S1018, by use of the above-mentioned four (or six) imaginary data points Pi' (Hxi', Hyi'), an imaginary offset point C' (Hx0', Hy0') on the XY coordinate plane that minimizes the function F1 given by formula (7) below is calculated.

[Formula 12]

$$F1=\Sigma_i(Hxi'^2+Hyi'^2-2Hxi'\cdot Hx0'-2Hyi'\cdot Hy0')^2 \quad (7)$$

Next, at step S1019, the imaginary offset point C' (Hx0', Hy0') on the XY coordinate plane is translated such that the previously done translation of the reference data point P7 is undone, and thereby the offset values Hx0 and Hy0 for the X and Y axes respectively are calculated.

Incidentally, the function F1 given by formula (7) is equivalent to the function of the curved line H2 given by formula (6). That is, at steps S1018 and S1019, through offset estimation processing with respect to a circle of geomagnetism described on the XY coordinate plane, the offset values Hx0 and Hy0 for the X and Y axes respectively are calculated.

As descried above, in offset calculation for the X and Y axes (steps S1017 through S1019), none of the magnetism detection data Hz for the Z axis is used. Accordingly, even when movement in the Z-axis direction is not so large as movement in the X- and Y-axis directions, this does not adversely affect offset calculation accuracy for the X and Y axes.

Next, at step S1020, the six data points P1 to P6 are all translated uniformly such that the reference data point P7 coincides with the origin O (0, 0, 0), and thereby, in the XYZ coordinate space, six imaginary data points Pi' (Hxi', Hyi', Hzi') (where i=1 to 6) are calculated. In a case where, at the preceding step S1017, the six points are all taken as the target of translation, the results can be stored in registers or the like, in which case the translation processing at step S1020 can be omitted.

Next, at step S1021, by using the imaginary offset point (Hx0', Hy0') found at the preceding step S1018 and the above-mentioned six imaginary data points Pi' (Hxi', Hyi', Hzi'), an imaginary offset value Hz0' that minimizes the function F2 given by formula (8) below is calculated.

[Formula 13]

$$F2=\Sigma_i(Hxi'^2+Hyi'^2+Hzi'^2-2Hxi'\cdot Hx0'-2Hyi'\cdot Hy0'-2Hzi'\cdot Hz0')^2 \quad (8)$$

The calculation formula of the imaginary offset value Hz0' is expressed by formula (9) below. The imaginary offset point (Hx0', Hy0') used in the formula, since their calculation process does not involve the magnetism detection data Hz for the Z axis, is highly reliable even when the data variation of the magnetism detection data Hz is small. Accordingly, by calculating the imaginary offset value Hz0' by using it, it is possible to enhance the reliability of the imaginary offset value Hz0'.

[Formula 14]

$$\frac{\partial F2}{\partial Hz0'} = \\ 2(-2)\Sigma_i\{Hzi'(Hxi'^2+Hyi'^2+Hzi'^2-2Hxi'Hx0'-2Hyi'Hy0'-2Hzi'Hz0')\} = \\ \Sigma_i Hxi'^2 Hzi' + \Sigma_i Hyi'^2 Hzi' + \Sigma_i Hzi'^3 - \\ 0 \to Hz0' = \frac{1}{2}\cdot\frac{2Hx0'\Sigma_i Hxi' Hzi' - 2Hy0'\Sigma_i Hyi' Hzi'}{\Sigma_i Hzi'^2} \quad (9)$$

Next, at step S1022, the data points P1 to P6 and the reference data point P7 are cleared, and the imaginary offset value Hz0' is translated such that the previously done translation of the reference data point P7 is undone, and thereby the offset value Hz0 for the Z axis is calculated.

Incidentally, the function F2 given by formula (8) is equivalent to the function of the curved surface H1 given by formula (5). That is, at steps S1020 and S1022, through offset estimation processing with respect to a sphere of geomagnetism described on the XY coordinate space, the offset value Hz0 for the Z axis is calculated.

Finally, at step S1023, new offset values (Hx0, Hy0, Hz0) are output. Thereafter, the flow returns to step S1011, so that the sequence of processing described above is repeated. As a result, an offset in the azimuth sensor 1001, which constantly changes both temporally and spatially, can be kept being canceled fast and continuously. It is thus possible to sense the azimuth accurately.

As described above, in the offset calculation processing of the third example, first, the offset values Hx0 and Hy0 for the X and Y axes, along which comparatively large data variation is expected to arise, are calculated, and then, by use of those calculation results, the offset value Hz0 for the Z axis, along which only comparatively small data variation is expected to arise, is calculated separately and independently.

With this offset calculation processing, even in a case where data variation along the Z axis is small compared with that along the X and Y axes, it is possible to calculate offset values for the individual axes correctly.

Offset Calculation Processing (Fourth Example)

Figure 21:
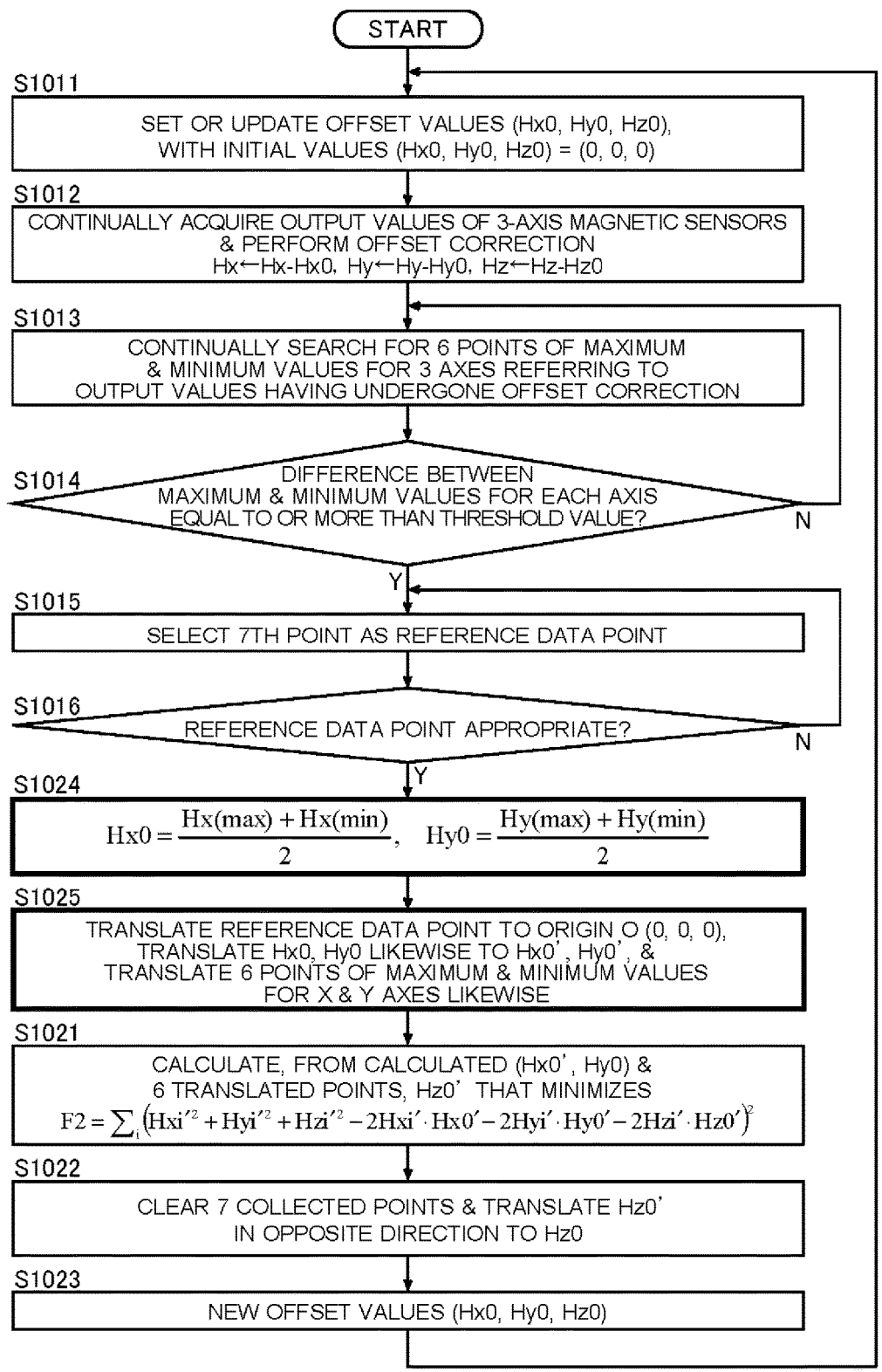
FIG. 21 is a flow chart showing a fourth example of offset calculation processing.

FIG. 21 is a flow chart showing a fourth example of the offset calculation processing. The offset calculation processing of the fourth example is based on the offset calculation processing of the third example (FIG. 20) and is characterized in that the offset calculation for the X and Y axes is simplified. Accordingly, such steps as find their counterparts in the third example are identified by the same reference signs as in FIG. 20, and no overlapping description will not be repeated. The following description focuses on features unique to the fourth example.

As indicated by thick frames in the chart, in the offset calculation processing of the fourth example, steps S1017 through S1020 in FIG. 20 are replaced with steps S1024 and S1025.

After steps S1011 through S1015 described previously are gone through, when step S1016 results in Yes, then, at step S1024, offset values Hx0 and Hy0 are calculated by use of, instead of formula (7) noted previously, formulae (10a) and (10b) below.

[Formula 15]

$$Hx0 = \frac{Hx(\max) + Hx(\min)}{2}, \quad (10a)$$

$$Hy0 = \frac{Hy(\max) + Hy(\min)}{2} \quad (10b)$$

Specifically, at step S1024, the average value of the maximum value Hx(max) and the minimum value Hx(min) for the X axis is calculated as the offset value Hx0 for the X axis, and the average value of the maximum value Hy(max) and the minimum value Hy(min) for the Y axis is calculated as the offset value Hy0 for the Y axis.

Next, at step S1025, the offset values Hx0 and Hy0 for the X and Y axes are translated such that the reference data point P7 coincides with the origin O (0, 0, 0), and thereby imaginary offset values Hx0' and Hy0' are calculated. Also for the data points P1 to P6, translation similar to that just described is performed, and thereby six imaginary data points Pi' (Hxi', Hyi', Hzi') (where i=1 to 6) are calculated.

Thereafter, the flow proceeds to step S1021 described previously, and through processing similar to that described previously, an offset value Hz0 for the Z axis is calculated.

As described above, with the offset calculation processing of the fourth example, as compared with the third example (FIG. 20), it is possible to simplify the offset calculation for the X and Y axes. It should however be noted that, to allow omission of offset estimation processing with respect to a circle of geomagnetism without degrading the calculation accuracy of the offset values Hx0 and Hy0, the azimuth sensor 1001 needs to be operated or moved so as to circle around one large turn on the horizontal plane.

With a configuration where, as shown in FIG. 17 referred to previously, the maximum and minimum data points for the individual axes are updated each time any of the differences ΔHx, ΔHy, and ΔHz for the individual axes increases, in a situation where the magnitude of geomagnetism in the surroundings is increasing, offset calculation processing can be continued without a problem; however, in a situation where the magnitude of geomagnetism in the surroundings is decreasing, the maximum and minimum values for the X and Y axes are all fixed, and this makes correct offset calculation impossible.

To perform correct offset calculation even in a situation where the magnitude of geomagnetism is decreasing, one possible approach is clearing the maximum and minimum values for the X and Y axes periodically while continuing the offset calculation processing at step S1024, and another is performing the flow in FIG. 20 periodically and, when the magnitude of geomagnetism is extremely small, adopting the offset values previously calculated at steps S1017 through S1019.

<Setting Threshold Values>

Next, a method of setting the threshold values THx, THy, and THz with which the differences ΔHx, ΔHy, and ΔHz, respectively, are compared at step S1014 in FIGS. 20 and 21 will be described.

As described previously, with the offset calculation processing of the third and fourth examples, even in a case where the variation width of the magnetism detection data for the Z axis is small, the offset point C (Hx0, Hy0, Hz0) can be calculated accurately. However, where higher accuracy is sought, it is preferable to adopt two points that are at an adequate distance from each other as the maximum and minimum data points for each of the individual axes.

Figure 22:
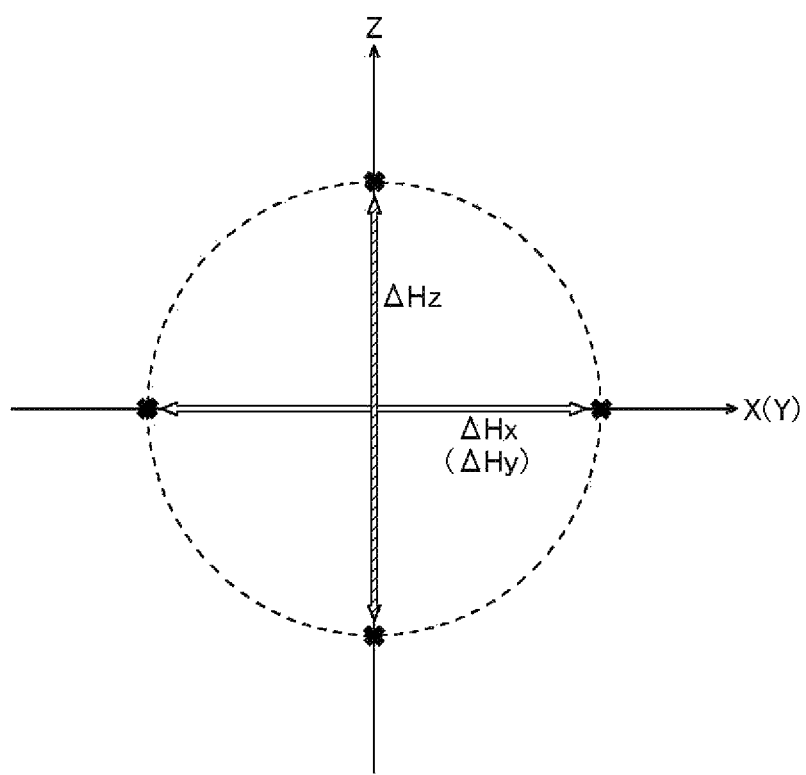
FIG. 22 is an XZ-plane view of a magnetic field (with large magnetic-field variation along the Z axis)
Figure 23:
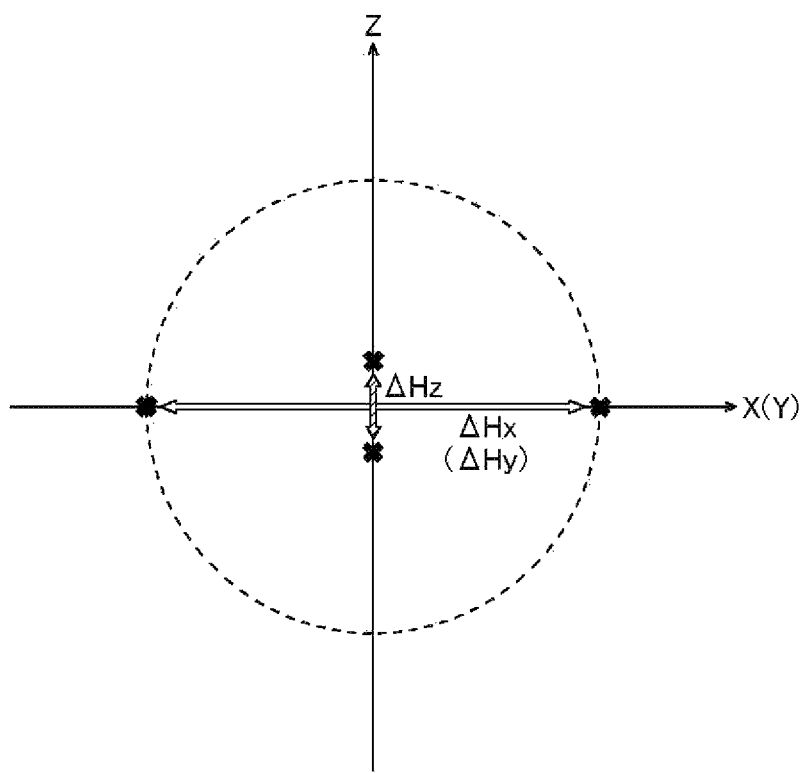
FIG. 23 is an XZ-plane view of a magnetic field (with small magnetic-field variation along the Z axis)

FIGS. 22 and 23 are each an XZ plane diagram (or a YZ plane diagram) of a magnetic field. FIG. 22 shows a case where magnetic field variation along the Z axis is comparatively large (for example, a case where the azimuth sensor 1001 is incorporated in a wrist watch), and FIG. 23 shows a case where magnetic field variation along the Z axis is comparatively small (for example, a case where the azimuth sensor 1001 is mounted on a vehicle).

In the diagrams, cross signs indicate the maximum and minimum data points for the individual axes. In the diagrams, broken lines indicate the sphere of geomagnetism that is intended to be estimated from the maximum and minimum data points for the individual axes. In both diagrams, the maximum and minimum data points for the X axis (or Y axis) are at an adequate distance from each other.

Comparing the two diagrams reveals that it is difficult to estimate the sphere of geomagnetism correctly when magnetic field variation along the Z axis is small (FIG. 23) as compared with when magnetic field variation along the Z axis is large (FIG. 22).

Moreover, the differences ΔHx, ΔHy, and ΔHz between the maximum and minimum values for the individual axes can take values different from each other. For example, consider a case where the X-axis direction is the front-rear direction of a vehicle, the Y-axis direction is the left-right direction of the vehicle, and the Z-axis direction is the up-down direction of the vehicle. In this case, the magnetism detection data Hx and Hy varies greatly during regular traveling of the vehicle (involving right and left turns, direction changes, and the like), and thus the differences ΔHx and ΔHy tend to be large. On the other hand, the magnetism detection data Hz does not vary so greatly even when the vehicle travels on a steep slope, and thus the difference ΔHz does not tend to be large.

Accordingly, it is preferable that the threshold value THz for the Z axis be set at a value smaller than the threshold values THx and THy for the X and Y axes respectively. This is because, if the threshold value THz is set at the same value as (or at a value similar to) the threshold values THx and THy, then at step S1014 described previously (see FIGS. 20 and 21), ΔHz≥THz is not satisfied, and thus a situation arises where calculation of offset values does not start no matter how long time passes.

Incidentally, the radius of the sphere of geomagnetism that is intended to be estimated from the maximum and minimum data points for the individual axes is equal to the magnitude |H| of the geomagnetism that describes it. In view of this, it is preferable that the threshold values THx, THy, and THz be set for the individual axes respectively according to the magnitude |H| of geomagnetism (hence the magnitude of the spatial magnetic field at the site where the azimuth sensor 1001 is present).

The magnitude H of geomagnetism can be calculated, by use of the magnetism detection data (Hx, Hy, Hz) for the individual axes and their respective offset values (Hoffx, Hoffy, Hoffz), according to formula (11) below. As the just-mentioned offset values (Hoffx, Hoffy, Hoffz), the offset values found in the first session of offset calculation may be used, or reliable offset values that were calculated in the past may be used.

[Formula 16]

$$|H|=\sqrt{(Hx-Hoffx)^2+(Hy-Hoffy)^2+(Hz-Hoffz)^2} \quad (11)$$

The magnitude |H| of geomagnetism can be calculated, by use of the imaginary offset point C' (Hx0', Hy0', Hz0') derived during the offset calculation processing of the third example (FIG. 20) or the fourth example (FIG. 21), according to formula (12) below.

[Formula 17]

$$|H|=\sqrt{Hx0'^2+Hy0'^2+Hz0'^2} \quad (12)$$

Figure 24:
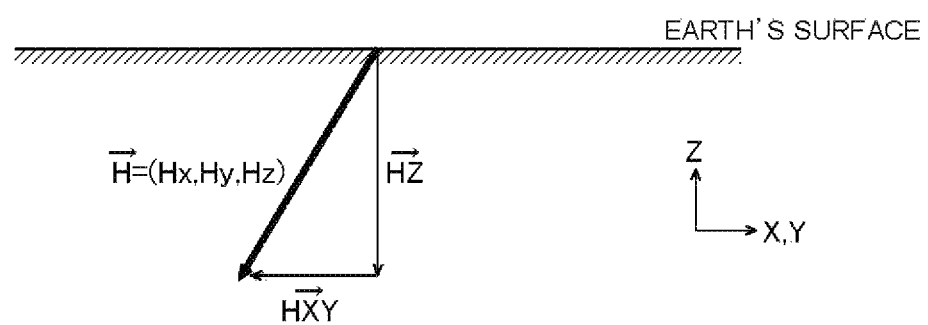
FIG. 24 is a diagram showing geomagnetism broken down into components.

In a case where the azimuth sensor 1001 is fixed to be horizontal with respect to the earth's surface, as shown in FIG. 24, the magnitude H of geomagnetism can be broken down into an XY-plane component |HXY| (the component of geomagnetism in the horizontal direction with respect to the earth's surface) and a Z-axis component |HZ| (the component of geomagnetism in the vertical direction with respect to the earth's surface).

Here, the XY-plane component |HXY| and the Z-axis component |HZ| of geomagnetism can be calculated, by use of the magnetism detection data (Hx, Hy, Hz) for the individual axes and their respective offset values (Hoffx, Hoffy, Hoffz), according to formulae (13a) and (13b) below.

[Formula 18]

$$|HXY|=\sqrt{(Hx-Hoffx)^2+(Hy-Hoffy)^2} \quad (13a),$$

$$|HZ|=|Hz-Hoffz| \quad (13b)$$

The XY-plane component |HXY| and the Z-axis component |HZ| of geomagnetism can also be calculated, by use of the imaginary offset point C' (Hx0', Hy0', Hz0') mentioned previously, according to formulae (14a) and (14b) below.

[Formula 19]

$$|HXY|=\sqrt{Hx0'^2+Hy0'^2} \quad (14a),$$

$$|HZ|=|Hz0'| \quad (14b)$$

One possible method of calculating the threshold values THx, THy, and THz for the individual axes from the magnitude |H| of geomagnetism found as described above or its XY-plane and Z-axis components |HXY| and |HZ| is, for example, calculating the threshold values THx and THy by multiplying the XY-plane component |HXY| by a coefficient GXY and calculating the threshold value THz by multiplying the Z-axis component |HZ| by a coefficient GZ.

Incidentally, when, at step S1018 in FIG. 20, the imaginary offset point C' (Hx0', Hy0') on the XY coordinate plane is found, if there is a magnetic field variation (movement of the azimuth sensor 1) that can describe an arc corresponding to about one-fourth of the whole circumference of the circle of geomagnetism, correct offset calculation is possible. Accordingly, for the X- and Y-axis directions, if there is a magnetic field variation as just mentioned, the coefficient GXY (for example, about 1.0) can be set such that ΔHx≥THx and ΔHy≥THy are both satisfied.

On the other hand, for the Z-axis direction, in view of the fact that the magnetism detection data Hz varies little, the coefficient GZ (for example, about 0.1) needs to be set appropriately such that ΔHz≥Thz is satisfied at a certain frequency. Setting the coefficient GZ large causes offset calculation to be performed less often, and, by contrast, setting the coefficient GZ small causes offset calculation to be performed more often.

The above description deals with, as an example, a method of calculating the threshold values THx, THy, and THz for the individual axes based not on the magnitude |H| of geomagnetism but on its XY-plane and Z-axis components |HXY| and |HZ|. Instead, it is also possible, more simply, to calculate the threshold values THx, THy, and THz by multiplying the magnitude |H| of geomagnetism itself by coefficients GX, GY, and GZ for the individual axes respectively.

The magnitude |H| of geomagnetism does not necessarily have to be calculated according to formula (11) or (12) noted above; it may instead be calculated, for example, according to a predetermined approximating calculation formula based on location information obtained from a GPS (global positioning system). Or it may be derived from a library of magnetic field map information such as that provided by Geospatial Information Authority of Japan.

Figure 25:
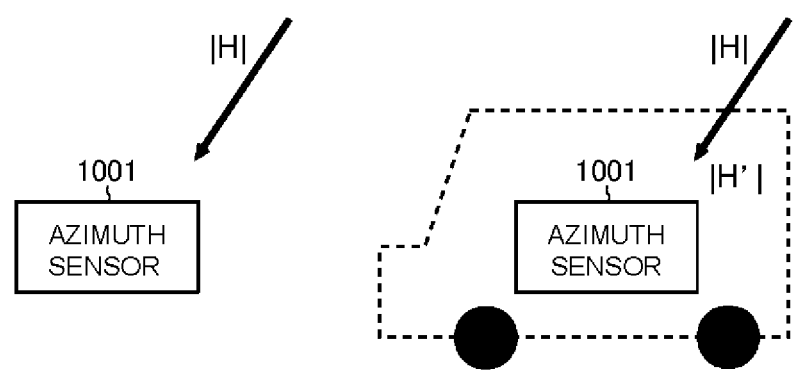
FIG. 25 is a schematic diagram showing an example of the environment dependence of the magnitude of the geomagnetism.

FIG. 25 is a schematic diagram showing an example of the environment dependence of the magnitude |H| of geomagnetism. As shown there, even at the same geographic spot, the magnitude |H| of geomagnetism may deviate from the ideal value depending on whether the azimuth sensor 1001 is located outside or inside a vehicle (|H|≠|H'|). Phenomena similar to what has just been mentioned can occur between inside and outside other shielding objects (such as buildings and tunnels).

Accordingly, in a case where the azimuth sensor 1001 is likely to be installed inside a shielding object, it is preferable to previously examine the differences between the magnetism detection data obtained outside the shielding object and the magnetism detection data obtained inside the shielding object at the same geographic spot and set the threshold values THx, THy, and THz appropriately with those differences taken into consideration.

<Using the Magnetic Dip>

The threshold value setting method described above pays attention only to the magnitude |H| of geomagnetism. The following description pays attention also to the magnetic dip α of geomagnetism (=the angle at which a line of geomagnetism enters the earth's surface, or the angle at which a line of geomagnetism exits from the earth's surface). Geomagnetism radiates from near the south pole to near the north pole of the earth, and it is known that the magnetic dip α of geomagnetism varies with the longitude and latitude of the observation site. Locally considered, however, the magnetic dip α of geomagnetism can be considered to have a largely constant value. For example, in Tokyo, the magnetic dip α is about 49 degrees.

By using the magnetic dip α, the magnitude |H| of the geomagnetism at the site can be broken down into an XY-plane component |HXY| and a Z-axis component |HZ|.

Figure 26:
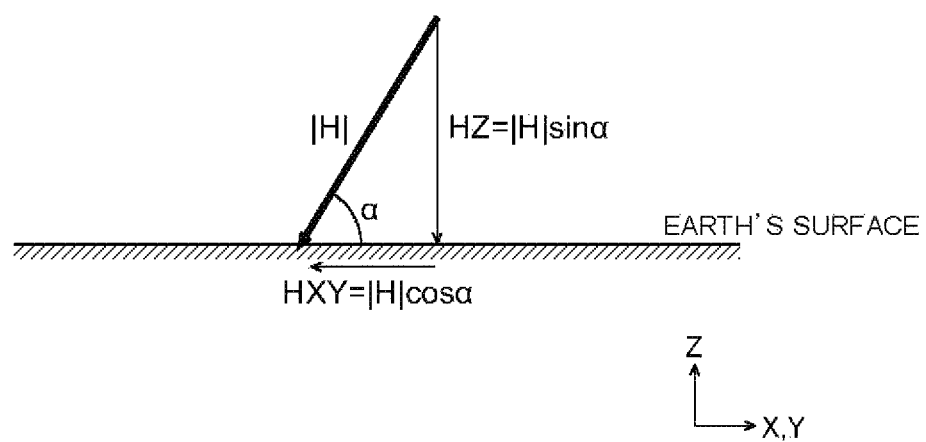
FIG. 26 is a schematic diagram showing the magnetic dip of the geomagnetism.

FIG. 26 is a schematic diagram showing the magnetic dip α of geomagnetism. As will be understood from the diagram, the XY-plane and Z-axis components |HXY| and |HZ| of geomagnetism can be calculated, by use of the magnitude |H| of geomagnetism and the magnetic dip α, according to formulae (15a) and (15b) below.

[Formula 20]

$$|HXY|=|H|\cos\alpha \quad (15a)$$

$$|HZ|=|HZ|\sin\alpha \quad (15b)$$

The thus calculated XY-plane and Z-axis components |HXY| and |HZ| of geomagnetism can be used, after being multiplied by coefficients GXY and GZ respectively as described above, in the processing for the setting of the threshold values THx, THy, and THz.

Figure 27:
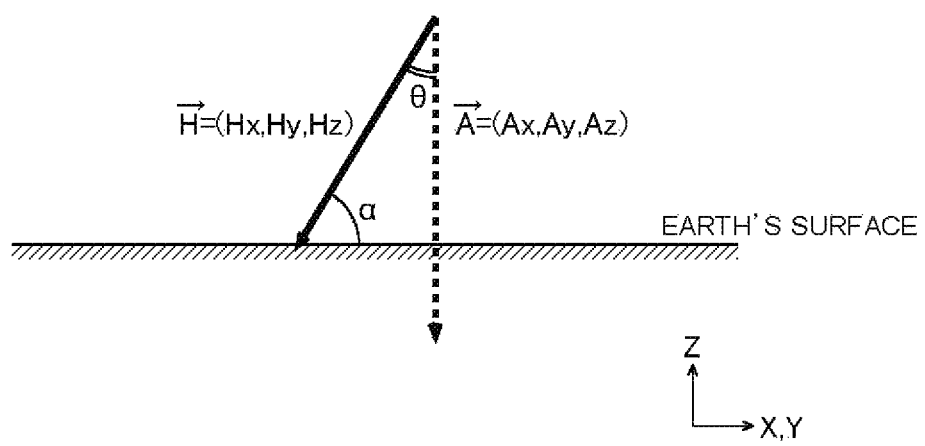
FIG. 27 is a diagram showing the correlation between magnetism detection data and acceleration data.

FIG. 27 is a diagram showing the correlation between magnetism detection data H and acceleration data A. As will be understood from the diagram, the magnetic dip α used in the previous computation can be calculated, through the calculation of the inner product between the magnetism detection data H and the acceleration data A, according to formula (16) below.

[Formula 21]

$$\vec{A}\cdot\vec{H} = AxHx + AyHy + AzHz = |\vec{A}||\vec{H}|\cos\theta \to \alpha = \frac{\pi}{2} - \theta = \frac{\pi}{2} - \cos^{-1}\left(\frac{AxHx + AyHy + AzHz}{|\vec{A}||\vec{H}|}\right) \quad (16)$$

In the above-described offset calculation for the magnetism detection data (Hx, Hy, Hz), the offset values calculated in the first-time offset calculation may be used, or reliable offset values that were calculated in the past may be used.

As the above-mentioned acceleration data A (Ax, Ay, Az), the output of an acceleration sensor provided separately from the azimuth sensor 1001 may be used, or an acceleration sensing function may be incorporated in the azimuth sensor 1001. In either case, for correct calculation of the magnetic dip α, as the above-mentioned acceleration data A, only the acceleration of gravity has to be sensed. Accordingly, care should be taken, during the calculation of the magnetic dip α, to maintain a state of rest, a state of uniform linear motion, or a state of low-acceleration motion (a state of motion where the acceleration accompanying a movement is lower than a predetermined threshold value and the target of sensing can be regarded as the acceleration of gravity alone).

The magnetic dip α does not necessarily have to be calculated according to formula (16) noted above; it may instead be calculated, for example, according to a predetermined approximating calculation formula based on location information obtained from a GPS, or may be derived from a library of magnetic field map information such as that provided by Geospatial Information Authority of Japan.

<Offset Updating Processing>

Figure 28:
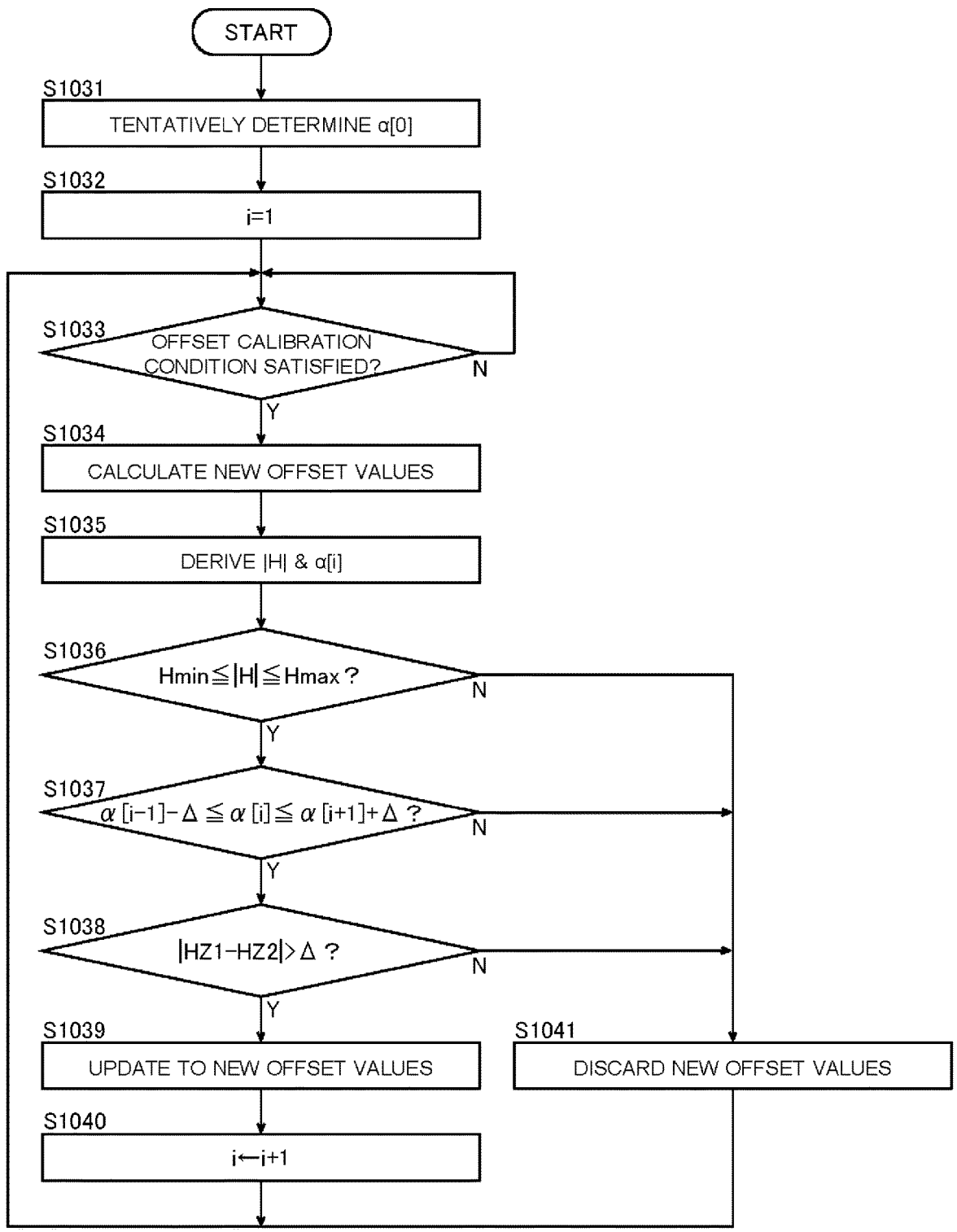
FIG. 28 is a flow chart showing one example of offset updating processing.

FIG. 28 is a flow chart showing one example of offset updating processing. The flow corresponds to postprocessing following the offset calculation processing (FIGS. 15, 20, and 219) thus far described, and serves to evaluate the accuracy (reliability) of the new offset values that have been calculated newly.

When the flow starts, first, at step S1031, the initial value α[0] of the magnetic dip α is determined tentatively, and subsequently, at step S1032, initial setting of the number of times of offset updating is performed (i=1).

The initial value α0 may be calculated by use of the offset values calculated in the first-time offset calculation, or may be calculated by use of reliable offset values calculated in the past. It may instead be calculated, for example, according to a predetermined approximating calculation formula based on location information obtained from a GPS, or may be derived from a library of magnetic dip information. Even without a GPS, magnetic dip information may be prepared for each country so that the initial value α0 can be set based on it.

Next, at step S1033, it is checked whether or not an offset updating condition is satisfied. This check corresponds to the previous steps S1003 and S1004 (FIG. 15) or S1013 and S1014 (FIGS. 20 and 21). At step S1033, if the result is Yes, the flow proceeds to step S1034 and, if the result is No, the check at step S1033 is repeated.

When step S1033 results in Yes, then, first, at step S1034, new offset values (Hx0, Hy0, and Hz0) are calculated newly, and subsequently, at step S1035, by use of the new offset values, the magnitude H of geomagnetism and the magnetic dip α[i] are calculated.

Subsequently, at step S1036, it is checked whether or not the magnitude |H| of geomagnetism calculated by use of the new offset values satisfies the relationship Hmin≤|H|≤Hmax. If the result is Yes, the flow proceeds to step S1037, and if the result is No, the flow proceeds to step S1041.

The minimum and maximum values Hmin and Hmax mentioned above can each be set with consideration given to the magnitude of geomagnetism on the earth as it is generally observed, and can be set, for example, such that Hmin=10 μT (=100 mG) and Hmax=70 μT (=700 mG). Needless to say, in a case where an approximate magnitude of geomagnetism at the site where the azimuth sensor 1001 is present is known, the minimum and maximum values Hmin and Hmax may be set more appropriately.

When step S1036 results in Yes, then, at step S1037, it is checked whether or not the magnetic dip α[i] calculated by use of the new offset values satisfies α[i−1]−Δ≤α[i]≤α[i−1]+Δ. That is, at step S1037, it is checked whether or not the magnetic dip α[i] calculated by use of the new offset values deviates significantly from the magnetic dip α[i−1] calculated by use of the offset values obtained last time. If the result is Yes, the flow proceeds to step S1038, and if the result is No, the flow proceeds to step S1041.

If step S1037 results in Yes, then, at step S1038, it is checked whether or not the Z-axis component |HZ1| calculated according to formula (13b) or (14b) noted previously and the Z-axis component |HZ2| calculated according to formula (15b) noted previously satisfy |HZ1−HZ2|<Δ. That is, at step S1038, it is checked whether or not the Z-axis component |HZ1| calculated without the use of the magnetic dip α[i] and the Z-axis component |HZ2| calculated by use of the magnetic dip α[i] can be regarded as identical values.

If the result is Yes, the flow proceeds to step S1039, and if the result is No, the flow proceeds to step S1041.

When the step S1038 results in Yes, then, at step S1039, it is judged that the magnitude |H| of geomagnetism and the magnetic dip α[i] calculated by use of the new offset values both fall in the normal ranges and thus that the new offset values are reliable; thus, updating from the old offset values to the new offset values is performed definitively. Then, at step S1040, the number of times i of offset updating is incremented by one (i←i+1), and then the flow returns to step S1033.

On the other hand, when any of steps S1036 through S1038 results in No, then, at step S1041, it is judged that at least one of the magnitude H of geomagnetism and the magnetic dip α[i] calculated by use of the new offset values falls outside the normal range and thus that the new offset values are not reliable; thus, the new offset values are discarded, and the flow returns to step S1033.

In the above flow, at step S1037, along with the number of times i of offset updating, the normal range of the magnetic dip α is also updated regularly. Instead, the normal range of the magnetic dip α may be basically fixed and be switched only when a movement over so long a distance as to cause the magnetic dip α to vary greatly takes place.

Moreover, in the above flow, at step S1036, the normal range of the magnitude |H| of geomagnetism is fixed. Instead, as at step S1037, along with the number of times i of offset updating, the normal range of the magnitude |H| of geomagnetism may be updated regularly.

Not all of the checks at the three steps S1036 through S1038 have to be performed; any one or two of them may only be performed. Those steps may be performed in any order.

Even when such new offset values are obtained as satisfy the above-mentioned various conditions (steps S1036 through S1038), not a small deviation can occur between the new offset values and the offset values last time.

To cope with that, that is, to prevent a discontinuous change in the offset values on the occasion of their updating, it is preferable to preform low-pass filtering expressed by formula (17) below.

[Formula 22]

$$H0'[t] = cH0'[t-1] + (1-c)H0[t], 0 \leq c \leq 1 \quad (17)$$

In the above formula, H0[t] represents an offset value at time t, and H0'[t] represents the offset value after filtering at time t. The smaller the coefficient c in the formula, the better the response of the offset value; by contrast, the larger the coefficient c, the smoother the variation of the offset value.

As described above, in offset calculation processing, offset calculation for the X and Y axes (for example, horizontal axes with respect to the earth's surface) and offset calculation for the Z axis (for example, a vertical axis with respect to the earth's surface) are separated from each other, and preprocessing (setting appropriate threshold values) and postprocessing (checking the accuracy of new offset values) are added; thus, it is possible to enhance the reliability of offset calculation processing.

<Example of Application of Azimuth Sensors>

FIGS. 29 to 32 are exterior views of electronic devices (a smartphone 100, a tablet computer 200, and a smartwatch 300) and a vehicle 400, each incorporating the azimuth sensor 1001. By using the azimuth sensor 1001 described previously as their respective electronic compasses, it is possible to accurately sense the direction in which the user carrying them is pointing or the direction in which the vehicle 400 is traveling. In particular, by using the electronic compass in combination with a GPS (global positioning system), it is possible to enhance the accuracy of location sensing in map application software and navigation application software. It can be said that incorporating an electronic compass in a vehicle 400 to enable it to sense the absolute bearing is extremely important to support advanced automatic driving technology.

The various technical features disclosed herein may be implemented in any other manner than specifically described by way of embodiments above, and allow for many modifications within the scope of the technical ingenuity of the invention. That is, the embodiments described above should be considered to be in every aspect illustrative and not restrictive, and the technical scope of the present invention should be understood to be defined not by the description of embodiments given above but by the appended claims and to encompasses any modifications in the sense and scope equivalent to those of the claims.

INDUSTRIAL APPLICABILITY

The invention disclosed herein finds applications in azimuth sensors incorporated in, for example, portable devices (smartphones, tablet computers, smartwatches, etc.) and mobile bodies (vehicles, vessels, aircraft, drones, etc.)

LIST OF REFERENCE SIGNS 1 azimuth sensor
10 magnetism detector
20 offset corrector
30 offset deriver
31 initial setter
32 offset calibration condition checker
33 tentative value deriver
34 updater
40 azimuth calculator
1001 azimuth sensor
1010 magnetism detector
1010x, 1010y, 1010z magnetic sensor (X-axis, Y-axis, Z-axis)
1020 offset corrector
1030 offset calculator
1040 azimuth calculator
100 smartphone
200 tablet computer
300 smartwatch
400 vehicle

The invention claimed is:

1. An offset derivation device that derives an offset value for generating corrected magnetism detection data by correcting original magnetism detection data acquired sequentially as data points in a three- or two-axis coordinate system through sensing of magnetism along three or two axes, the device comprising:

a tentative value deriver configured to calculate a tentative value of the offset value by using a plurality of data points in the original or corrected magnetism detection data; and an updater configured to derive magnitude of the magnetism based on the original magnetism detection data and the tentative value, the updater being configured, if the derived magnitude of the magnetism is within a predetermined reference range, to update the offset value with the tentative value and otherwise to keep the offset value unupdated, wherein the tentative value deriver is configured
- to take one of the plurality of data points, which comprise N data points (where N is an integer of 2 or more), as a reference data point, and translate uniformly the plurality of data points such that the reference data point coincides with an origin of the three- or two-axis coordinate system, thereby to set (N−1) imaginary data points except for the reference data point, and then
- to derive, as an imaginary offset point, either a point that is located at a center of a curved surface passing through the origin O of the three-axis coordinate system and that minimizes a sum of distances from the curved surface to the respective imaginary data points or a point that is located at a center of a curved line passing through the origin O of the two-axis coordinate system and that minimizes a sum of distances from the curved line to the respective imaginary data points, and translate the imaginary offset point such that previously done translation is undone, thereby to derive the tentative value, wherein when, in the three-axis coordinate system, coordinate values of an ith imaginary data point among the (N−1) imaginary data points are represented by (Hxi', Hyi', Hzi') (where i is an integer of 1 or more but (N−1) or less) and coordinate values of the imaginary offset point are represented by (Hx0', Hy0', Hz0'), the tentative value deriver derives the coordinate values of the imaginary offset value so as to minimize a value of a function $F_{H1}$ given by formula (A1) below:

$$F_{H1} = \sum_{i=1}^{N-1} (Hxi'^2 + Hyi'^2 + Hzi'^2 - 2Hxi' \cdot Hx0' - 2Hyi' \cdot Hy0' - 2Hzi' \cdot Hz0')^2. \quad (A1)$$

2. The offset derivation device according to claim 1, wherein
the updater is configured, if the derived magnitude of the magnetism is within the predetermined reference range, to update the offset value with the tentative value and update also the reference range based on the derive magnitude of the magnetism, and otherwise to keep the offset value and the reference range unupdated.

3. The offset derivation device according to claim 2, wherein
when the reference range is updated based on the derived magnitude of the magnetism, the updated reference range is a range that includes the derived magnitude of the magnetism.

4. The offset derivation device according to claim 3, wherein
when the reference range is updated based on the derived magnitude of the magnetism, the updated reference range is a range that is centered about the derived magnitude of the magnetism.

5. The offset derivation device according to claim 1, further comprising:
an initial setter configured to set, as the reference range before updating, an initial reference range based on the original magnetism detection data.

6. An offset derivation device that derives an offset value for generating corrected magnetism detection data by correcting original magnetism detection data acquired sequentially as data points in a three- or two-axis coordinate system through sensing of magnetism along three or two axes, the device comprising:
a tentative value deriver configured to calculate a tentative value of the offset value by using a plurality of data points in the original or corrected magnetism detection data; and
an updater configured to derive magnitude of the magnetism based on the original magnetism detection data and the tentative value, the updater being configured, if the derived magnitude of the magnetism is within a predetermined reference range, to update the offset value with the tentative value and otherwise to keep the offset value unupdated, wherein
the tentative value deriver is configured
- to take one of the plurality of data points, which comprise N data points (where N is an integer of 2 or more), as a reference data point, and translate uniformly the plurality of data points such that the reference data point coincides with an origin of the three- or two-axis coordinate system, thereby to set (N−1) imaginary data points except for the reference data point, and then
- to derive, as an imaginary offset point, either a point that is located at a center of a curved surface passing through the origin O of the three-axis coordinate system and that minimizes a sum of distances from the curved surface to the respective imaginary data points or a point that is located at a center of a curved line passing through the origin O of the two-axis coordinate system and that minimizes a sum of distances from the curved line to the respective imaginary data points, and translate the imaginary offset point such that previously done translation is undone, thereby to derive the tentative value, wherein when, in the two-axis coordinate system, coordinate values of an ith imaginary data point among the (N−1) imaginary data points are represented by (Hxi', Hyi') (where i is an integer of 1 or more but (N−1) or less) and coordinate values of the imaginary offset point are represented by (Hx0', Hy0'), the tentative value deriver derives the coordinate values of the imaginary offset value so as to minimize a value of a function $F_{H2}$ given by formula (A2) below:

[Formula 2]

$$F_{H2} = \sum_{i=1}^{N-1} (Hxi'^2 + Hyi'^2 - 2Hxi' \cdot Hx0' - 2Hyi' \cdot Hy0')^2. \quad (A2)$$

7. An azimuth sensor comprising:
a magnetism detection device configured to generate original magnetism detection data through sensing of magnetism along three or two axes;
the offset derivation device according to claim 1 configured to derive an offset value for the original magnetism detection data;
an offset correction device configured to generate corrected magnetism detection data by correcting the original magnetism detection data by using the offset value; and
an azimuth calculator configured to generate azimuth data from the corrected magnetism detection data.

8. An electronic device comprising:
the azimuth sensor according to claim 7.

9. An offset calculation device configured
to refer to three-axis magnetism detection data acquired sequentially as data points in a three-axis coordinate space, thereby to continually search for six data points (Hxi, Hyi, Hzi) (where i=1 to 6) corresponding to maximum values and minimum values for individual axes respectively;
to determine a seventh reference data point (Hx7, Hy7, Hz7) when differences between the maximum and minimum values for the individual axes respectively are all larger than a threshold value;
to translate uniformly, of the six data points, at least four points corresponding respectively to the maximum and minimum values for X and Y axes such that the reference data point coincides with an origin (0, 0, 0) while ignoring coordinate values for a Z axis, thereby to calculate imaginary data points (Hxi', Hyi') (where i=1 to 4) on an XY coordinate plane;
to calculate an imaginary offset point (Hx0', Hy0') on the XY coordinate plane that minimizes a function F1 given by formula (f1) below by using the imaginary data points (Hxi', Hyi');

$$F1 = \Sigma_i(Hxi'^2 + Hyi'^2 - 2Hxi' \cdot Hx0' - 2Hyi' \cdot Hy0')^2 \quad (f1)$$

to translate the imaginary offset point (Hx0', Hy0') such that previously done translation of the reference data point is undone, thereby to calculate offset values Hx0 and Hy0 for the X and Y axes;
to translate uniformly the six data points such that the reference data point coincides with the origin, thereby to calculate six imaginary data points (Hxi', Hyi', Hzi') (where i=1 to 6);
to calculate an imaginary offset value Hz0' that minimizes a function F2 given by formula (f2) below by using the imaginary offset point (Hx0', Hy0') and the six imaginary data points (Hxi', Hyi', Hzi'); and $$F2 = \Sigma_i(Hxi'^2 + Hyi'^2 + Hzi'^2 - 2Hxi' \cdot Hx0' - 2Hyi' \cdot Hy0' - 2Hzi' \cdot Hz0')^2 \quad (f2)$$

to translate the imaginary offset value Hz0' such that previously done translation of the reference data point is undone, thereby to calculate an offset value Hz0 for the Z axis.

10. An offset calculation device configured
to refer to three-axis magnetism detection data acquired sequentially as data points in a three-axis coordinate space, thereby to continually search for six data points (Hxi, Hyi, Hzi) (where i=1 to 6) corresponding to maximum values and minimum values for individual axes respectively;
to determine a seventh reference data point (Hx7, Hy7, Hz7) when differences between the maximum and minimum values for the individual axes respectively are all larger than a threshold value;
to calculate offset values Hx0 and Hy0 are calculated for X and Y axes by use of formula (f3a) and (f3b) below.

$$Hx0 = \frac{Hx(\max) + Hx(\min)}{2}, \quad (f3a)$$

$$Hy0 = \frac{Hy(\max) + Hy(\min)}{2}, \quad (f3b)$$

in formula (f3a) and (f3b) above, Hx(max) and Hx(min) representing maximum value and minimum value for the X axis, and Hy(max) and Hy(min) representing maximum value and minimum value for the Y axis,
to translate uniformly the six data points such that the reference data point coincides with the origin, thereby to calculate six imaginary data points (Hxi', Hyi', Hzi') (where i=1 to 6);
to calculate an imaginary offset value Hz0' that minimizes a function F2 given by formula (f2) below by using the imaginary offset point (Hx0', Hy0') and the six imaginary data points (Hxi', Hyi', Hzi'); and $$F2 = \Sigma_i(Hxi'^2 + Hyi'^2 + Hzi'^2 - 2Hxi' \cdot Hx0' - 2Hyi' \cdot Hy0' - 2Hzi' \cdot Hz0')^2 \quad (f2)$$

to translate the imaginary offset value Hz0' such that previously done translation of the reference data point is undone, thereby to calculate an offset value Hz0 for a Z axis.

11. The offset calculation device according to claim 9, wherein
the threshold value is set separately for each of the individual axes according to magnitude of a spatial magnetic field at a site or according to an XY-plane component and a Z-axis component obtained by breaking it down.

12. The offset calculation device according to claim 11, wherein
a threshold value for the Z axis is smaller than either of threshold values for the X and Y axes.

13. The offset calculation device according to claim 11, wherein
the magnitude of the spatial magnetic field is broken down into the XY-plane and Z-axis components by use of a magnetic dip of geomagnetism at the site.

14. The offset calculation device according to claim 13, wherein
the magnitude of the spatial magnetic field and the magnetic dip are calculated by use of new offset values newly calculated for the individual axes, and according to whether or not the calculated values each satisfy a predetermined condition, whether or not to discard the new offset values is decided.

15. The offset calculation device according to claim 9, wherein
the reference data point is a data point at a predetermined distance or more from any of, of the six data points, at least four points corresponding respectively to the maximum and minimum values for the X and Y axes.

16. An azimuth sensor comprising:
a magnetism detection device configured to generate three-axis magnetism detection data;
the offset calculation device according to claim 9 configured to calculate an offset value for the magnetism detection data;
an offset correction device configured to correct the offset value for the magnetism detection data; and
an azimuth computation device configured to generate azimuth data from the corrected magnetism detection data.

* * * * *